(12) United States Patent
Hirayama et al.

(10) Patent No.: US 8,606,081 B2
(45) Date of Patent: Dec. 10, 2013

(54) STREAM DATA RECORDING DEVICE, STREAM DATA RECORDING/REPRODUCING DEVICE, STREAM DATA REPRODUCTION DEVICE, STREAM DATA EDITING DEVICE, STREAM RECORDING METHOD, AND STREAM REPRODUCING METHOD

(75) Inventors: Kazuhiko Hirayama, Osaka (JP); Akihiro Miyazaki, Osaka (JP); Michiko Fuchikami, Fukuoka (JP); Norihiro Matsui, Osaka (JP); Nobunari Murai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1023 days.

(21) Appl. No.: 11/886,674

(22) PCT Filed: Mar. 22, 2006

(86) PCT No.: PCT/JP2006/305712
§ 371 (c)(1),
(2), (4) Date: Nov. 6, 2008

(87) PCT Pub. No.: WO2006/101131
PCT Pub. Date: Sep. 28, 2006

(65) Prior Publication Data
US 2009/0103892 A1   Apr. 23, 2009

(30) Foreign Application Priority Data

Mar. 22, 2005  (JP) ................................. 2005-082326
May 31, 2005  (JP) ................................. 2005-160482

(51) Int. Cl.
*H04N 5/94*  (2006.01)

(52) U.S. Cl.
USPC ....................................................... 386/270

(58) Field of Classification Search
USPC .......... 386/264, 270, 271, 272; 714/745–747, 714/755
See application file for complete search history.

(56) References Cited

U.S. PATENT DOCUMENTS 6,360,057 B1   3/2002   Tsumagari et al.
6,871,007 B1 *  3/2005   Saeijs et al. ................... 386/241

(Continued)

FOREIGN PATENT DOCUMENTS

| | | |
|---|---|---|
| EP | 0 969 673 | 1/2000 |
| EP | 1 280 347 | 1/2003 |
| JP | 2001-309262 | 11/2001 |
| JP | 2002-359603 | 12/2002 |
| JP | 2003-125378 | 4/2003 |
| JP | 2003-304498 | 10/2003 |
| WO | 03/098626 | 11/2003 |

OTHER PUBLICATIONS

International Search Report of International Application PCT/JP2006/305712 dated Jun. 20, 2006.
PCT/IPEA/409 of International Application PCT/JP2006/305712 dated Jul. 10, 2007.
Extended European Search Report mailed Jul. 17, 2013 in corresponding European Patent Application No. 06729679.8.

*Primary Examiner* — Thai Tran
*Assistant Examiner* — William Tran
(74) *Attorney, Agent, or Firm* — Wenderoth, Lind & Ponack, L.L.P.

(57) ABSTRACT

A stream data recording device is provided for recording stream data on a recording medium. The stream data recording device includes a stream reception/analysis unit (101), acquiring stream data from reception data, a a missing portion detection unit (102) detecting a missing packet portion in the acquired stream data, a section information generation unit (103) generating time information specifying the duration of the unreceivable section including the packets whose missing portion has been detected and position information specifying the position of the unreceivable section in the stream data, and a recording unit (105) recording the acquired stream data, the generated time information and position information on the recording medium. Thus, even if the recording-target stream data is missing a portion during reception of the stream data, the data can be correctly played back from the seek time specified by a user.

39 Claims, 34 Drawing Sheets

(56) References Cited

U.S. PATENT DOCUMENTS

| | | |
|---|---|---|
| 2002/0114283 A1* | 8/2002 | Lee .............................. 370/252 |
| 2002/0181600 A1 | 12/2002 | Matsuura et al. |
| 2003/0172326 A1 | 9/2003 | Coffin, III et al. |
| 2003/0192001 A1* | 10/2003 | Maiuzzo et al. ............. 714/755 |
| 2003/0219228 A1* | 11/2003 | Thiagarajan et al. ........... 386/83 |
| 2005/0071724 A1* | 3/2005 | Blacquiere et al. ........... 714/755 |
| 2005/0169303 A1* | 8/2005 | Toma et al. .................... 370/466 |
| 2006/0033846 A1* | 2/2006 | Ozaki et al. .................... 348/731 |
| 2007/0237098 A1* | 10/2007 | Wang ............................ 370/256 |

* cited by examiner

FIG.12

SEQUENCE INFORMATION

| Field Type | | Field Name | Meaning |
|---|---|---|---|
| BIT7 | | EntryType | ENTRY TYPE<br>000001b CONTINUOUS RECEPTION SECTION<br>0000011b UNRECEIVABLE SECTION |
| EntryType != 11b | BIT25 | TPI | TPI OF TS PACKET INCLUDING HEAD BYTE OF ENTRY HEAD AU |
| | UINT32 | StartTime | PTS OF HEAD VIDEO (OR AUDIO) AU IN CONTINUOUS RECEPTION SECTION (HIGH ORDER 32 BITS) |
| | UINT32 | Duration | CONTINUOUS RECEPTION SECTION PLAYBACK TIME (TIME SCALE 90kHz) |
| EntryType == 11b | BIT25 | TPI | TPI OF SECTION HEAD TS PACKET |
| | BIT32 | StartTime | SET TO "0" |
| | UINT32 | Duration | LENGTH OF UNRECEIVABLE SECTION<br>・DURATION IN REAL TIME (TIME SCALE 45kHz) IN RESPONSE TO OCCURRENCE OF PCR CONTINUITY DISRUPTION IN UNRECEIVABLE SECTION |

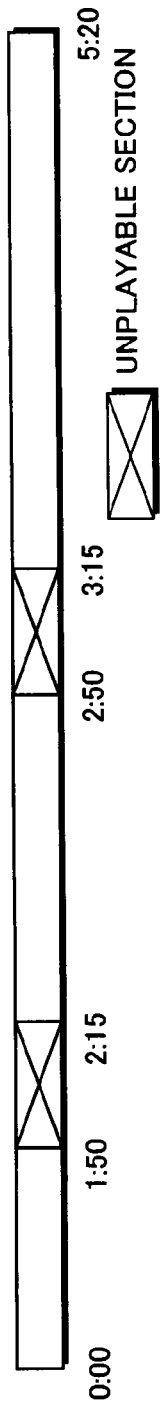
FIG.16A
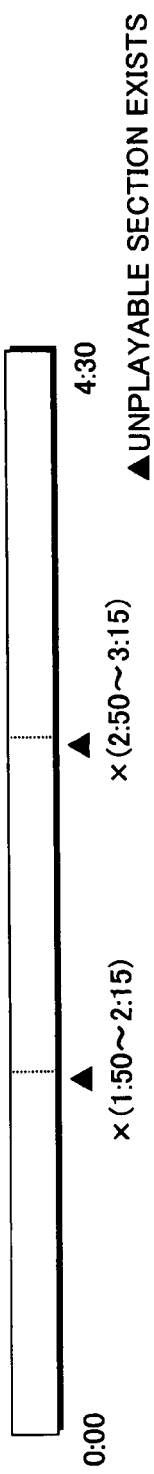
FIG.16B
FIG.16C
| TOTAL PLAYBACK TIME | |
|---|---|
| SCHEDULED TIME | 5 MINUTES 20 SECONDS |
| PLAYBACK SECTION | 4 MINUTES 30 SECONDS |
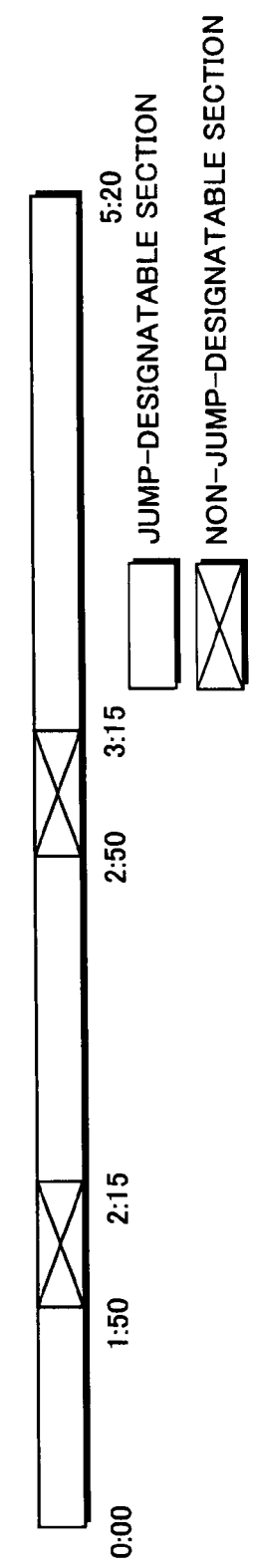
FIG.16D

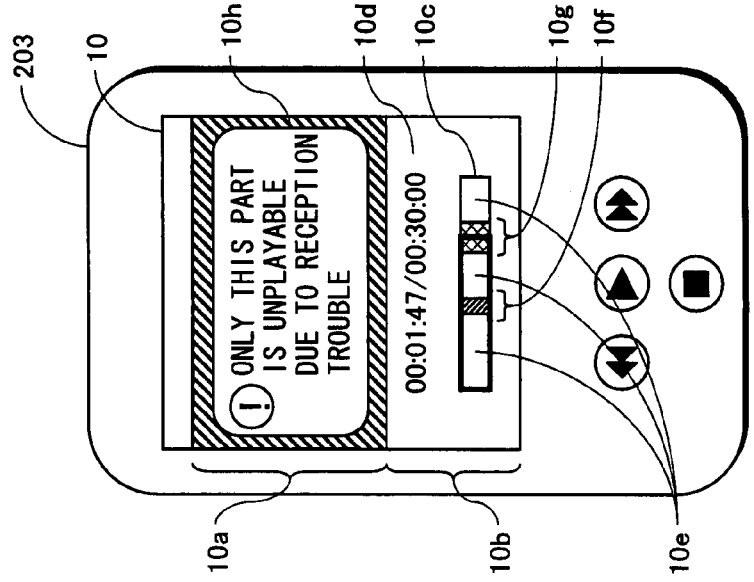

| QUALITY LEVEL | COLOR OF BAR OBJECT | PLAYBACK TIME DISPLAY OUTPUT TIMING | WARNING DISPLAY OUTPUT TIMING |
|---|---|---|---|
| NO MISSING PORTION | GREEN | NOT DISPLAYED | NOT DISPLAYED |
| VIDEO ENABLED (ONLY AUDIO MISSING) | ORANGE | | |
| AUDIO ENABLED (ONLY VIDEO MISSING) | | DISPLAYED | |
| DISABLED (MISSING PORTIONS IN BOTH) (LESS THAN PREDETERMINED TIME) | RED | | |
| DISABLED (MISSING PORTIONS IN BOTH) (GREATER THAN OR EQUAL TO PREDETERMINED TIME) | | | DISPLAYED |

FIG.19

SEQUENCE TABLE

| SECTION NUMBER n | SECTION HEAD TPI [n] | START PTS/PCR | Duration [n] |
|---|---|---|---|
| SECTION [1] | TPI [1] | StartTime [1] | Duration [1] |
| SECTION [2] | TPI [2] | 0 | Duration [2] (=DURATION OF UNRECEIVABLE SECTION) |
| SECTION [3] | TPI [3] | StartTime [3] | Duration [3] |

STREAM DATA RECORDING DEVICE, STREAM DATA RECORDING/REPRODUCING DEVICE, STREAM DATA REPRODUCTION DEVICE, STREAM DATA EDITING DEVICE, STREAM RECORDING METHOD, AND STREAM REPRODUCING METHOD

TECHNICAL FIELD

The present invention relates to technology for recording and playing back AV stream data.

BACKGROUND ART

Stream data broadcasting for mobile reception terminals is being focused on as a technique to enable easy enjoyment of stream data such as audio and video at any place and time.

Stream data that is broadcast in stream data broadcasts for mobile reception terminals include IDR pictures that can be played independently without referencing images before and after. When receiving and recording such stream data on a mobile reception terminal, for each IDR picture, the mobile reception terminal measures a stream time (hereinafter called an offset time) from the beginning of the stream data until playback of the IDR picture, generates index information, and records the index information along with the stream data. The index information correlates the measured offset time, an index number (hereinafter, called a TPI: Transport Packet Index) that indicates where in the stream data a TS (Transport Stream) packet corresponding to the head of a PES (Packetized Elementary Stream) including the IDR picture is located, a PTS (Presentation Time Stamp) of the IDR picture, and a data amount that is to be read in order to acquire the recorded IDR picture. Recording such index information along with the stream data enables designation of and playback starting from an IDR picture at an arbitrary time in the stream when the recorded stream data is being viewed. Generation and use of such meta-information enables so-called seeking to a user-specified arbitrary time in the stream data (hereinafter called a seek time).

In digital delivery of stream data, representative of which is digital broadcasting and Internet delivery, transmission signals include noise due to the influence of, for example, reflections off of buildings, and reflections in a network cable during signal transmission, which causes transmission errors. For this reason, in conventional digital delivery, transmission errors are handled by the employment of coding methods that enable error correction on the reception side, such as BdH (Bose, Chaudhuri, Hocquenghem) code and RS (Read Solomon) code.

Patent document 1: Japanese Patent Application Publication No. 2001-309262

DISCLOSURE OF THE INVENTION

Problems Solved by the Invention

However, when receiving stream data on a mobile reception terminal, there are cases in which the mobile reception terminal is moved to a poor reception area where radio waves are not easily received, and it is possible to have frequent occurrences of several-second time periods in which accurate transmission signals cannot be obtained. This type of situation cannot be handled by conventional error correction processing, and several seconds of stream data is lost. When proper reception is not performed, a stream data with a missing portion is recorded, and a problem such as the following occurs when playing back the stream data from an arbitrary seek time.

FIG. 1 shows playback times of broadcasted stream data on a horizontal axis, and PTSs on a vertical axis. A hatched portion in the drawing shows that a portion of stream data was missing during recording in the mobile reception terminal due to a degradation in reception. For this reason, an IDR [1] that was originally second in a group of IDR pictures indicated by dots has not been recorded. When a time A in the missing portion, or a time B after the missing portion but before IDR [2] is specified as the seek time, an IDR [0] that is the last IDR picture to be recorded before the missing portion is specified as a playback start target.

However, in the stream data broadcast for the mobile reception terminal, since an IDR picture appears at a short interval of normally two seconds or for a maximum of five seconds, when playback of the recorded stream data starts from the IDR [0], the playback position reaches the missing duration in a short time of not even two seconds. As a result, within a few seconds of the playback start, there is a risk of a user feeling discomfort due to audio and video distortion, skipping ahead of the playback position, etc.

The use of stream data broadcasts for mobile reception terminals is expected to expand, and there is an urgent need to develop a technique for recording that enables stream data to be played back appropriately even if a portion was lost during reception.

In view of the above problem, an aim of the present invention is to provide a stream data recording device and stream data editing device that can record stream data so as to avoid causing user discomfort when performing playback in correspondence with a seek time even if a portion of the stream data was missing during recording, and to provide a stream data playback apparatus that can play back stream data in correspondence with a seek time so as to avoid causing user discomfort even if a portion of the stream data was missing during recording.

Means to Solve the Problems

In order to solve the above problem, the present invention is a stream data playback apparatus including: a section information acquisition unit operable to acquire time information, insertion position information, receivable section time information, and receivable section insertion position information from a recording medium, on which has been recorded stream data, the time information specifying a duration of an unreceivable section that is composed of the packet that has been detected as missing when recording the stream data, the insertion position information specifying a starting position of the unreceivable section in the stream data, the receivable section time information specifying a duration of a receivable section which is composed of apacket that has not been detected as missing when recording the stream data, and is not include in the unreceivable section, and receivable section insertion position information specifying a starting position of the receivable section in the stream; a judgment unit operable to judge a playability of the stream data in the receivable section and the unreceivable section in accordance with information acquired by the section information acquisition unit; a read unit operable to read the stream data from the recording medium; and a playback unit operable to play back the read stream data depending on a result of the judgment by the judgment unit.

According to another aspect of the invention, the judgment unit of the stream data playback apparatus judges that a receivable section sandwiched between two unreceivable sections in unplayable if a duration of the receivable section is less than or equal to a predetermined threshold.

Further, according to another aspect of the invention, if the judgment unit of the stream data playback apparatus judges that the unreceivable section is playable, the playback unit plays back the packet that has been detected as missing in the unreceivable section, the packet having been recorded as a portion of the stream data on the recording medium.

According to yet another aspect of the invention, the stream data playback apparatus further comprises a status display unit operable to display a display object indicating a total duration of stream data recorded on the recording medium, wherein the display object is segmented into a first area indicating a position, a duration, and a quality level of the unreceivable section, and a second area indicating a position and a duration of the receivable section, the first and second areas being distinct from each other.

According to another aspect of the invention, the status display unit of the stream data playback apparatus is operable to display a display object indicating a total duration of stream data recorded on the recording medium, wherein the display object is segmented into a first area indicating a position, a duration, and a quality level of the unreceivable section, and a second area indicating a position and a duration of the receivable section, the first and second areas being distinct from each other.

In addition, according to another aspect of the invention, the status display unit of the stream data playback apparatus is operable to display a display object indicating a total duration of stream data recorded on the recording medium, wherein the display object, in accordance with a judgment result by the judgment unit, is segmented into a first area indicating a position of an unplayable section and a duration thereof, and a second area indicating a position of a playable section and a duration thereof, the first and second areas being distinct from each other.

In order to solve the above problem, the present invention is also a stream data recording apparatus that records stream data to a recording medium, including an acquisition unit operable to acquire stream data from reception data a detection unit operable to detect that the acquired stream data is missing a packet portion; a generation unit operable to generate time information specifying a duration of an unreceivable section including the missing packet portion and insertion position information specifying a position of the unreceivable section in the stream data; and a recording unit operable to record the acquired stream data, and to record the time information and the insertion position information in correspondence with the acquired stream data.

According to another aspect of the invention, the generation unit of the stream data recording apparatus generates the time information and the insertion position information if a total duration of a missing packet portion or a continuous series of missing packet portions detected by the detection unit is greater than or equal to a predetermined threshold, and does not generate the time information and the insertion position information if the total duration of the packet portion missing from the stream data is less than the predetermined threshold.

Further, according to another aspect of the invention, if the total duration is less than the predetermined threshold, the generation unit further generates quality information indicating a during-playback quality level of the stream data in accordance with the total duration.

According to another aspect of the invention, the generation unit further generates quality information indicating a during-playback quality level of the stream data depending on a number of occurrences, in a predetermined time period, of the detected missing packet portion or continuous series of missing packet portions whose total duration is below the predetermined threshold.

According to yet another aspect of the invention, the generation unit of the stream data recording apparatus further generates quality information indicating a during-playback quality level of the stream data depending on a cumulative time, in a predetermined time period, of the missing packet portion or the continuous series of missing packet portions detected by the detection unit whose total duration is below the predetermined threshold.

According to another aspect of the invention, the generation unit of the stream data recording apparatus generates the time information and the insertion position information if a total data size of a missing packet portion or a continuous series of missing packet portions detected by the detection unit is greater than or equal to a predetermined threshold, and does not generate the time information and the insertion position information if the data size of the packet portion missing from the stream data is less than the predetermined threshold.

Another aspect of the invention is that the generation unit of the stream data recording apparatus further generates quality information indicating a during-layback quality level of the stream data in accordance with the total data size if the total data size of the one or more missing portions in the stream data is less than the predetermined threshold.

According to another aspect of the invention, the stream data recording apparatus further includes: a judgment unit operable to judge that a receivable section sandwiched between two of the unreceivable sections is unplayable if a duration of the receivable section is less than or equal to a predetermined threshold; and an unplayable information generation unit operable to generate unplayable time information specifying a duration of the receivable section that has been judged to be unplayable and unplayable position information specifying a position in the stream data of the receivable section that has been judged to be unplayable.

According to yet another aspect of the invention the judgment unit of the stream data recording apparatus is operable to judge that the unreceivable section is playable if a duration of the unreceivable section specified by the time information is less than or equal to a predetermined threshold.

According to another aspect of the invention a quality judgment unit of the stream data recording apparatus judges a during-playback quality level of the unreceivable section in accordance with a duration specified by the time information of the unreceivable section.

Further, according to another aspect of the invention, the quality judgment unit of the stream data recording apparatus judges a during-playback quality level of one or more unreceivable section included in a predetermined time period depending on a number of the unreceivable sections whose durations specified by the time information are below the predetermined threshold that exists in the predetermined time period.

According to yet another aspect of the invention, the quality judgment unit of the stream data recording apparatus judges a during-playback quality level of one or more unreceivable sections included in a predetermined time period depending on a total duration specified by the time information of the unreceivable sections that exist in a predetermined time period.

According to another aspect of the invention, the quality judgment unit of the stream data recording apparatus judges a during-playback quality level of the unreceivable section depending on a data size of the packets in the unreceivable section that were recorded as part of the stream data and detected as missing.

In addition, according to another aspect of the invention, the quality judgment unit of the stream data recording apparatus judges a during-playback quality level of the unreceivable section in accordance with a type of packet that was detected as missing in the unreceivable section.

Effects of the Invention

According to the above structure, when a portion is missing during stream data reception, the stream data recording apparatus of the present invention records time information specifying a length of a missing portion in the stream data and position information specifying a position of the missing portion in the stream data to a recording medium along with the stream data that is missing a portion. When playing back stream data that was recorded by the stream data recording apparatus of the present invention, even when a time in an unreceivable section or a time immediately following an unreceivable section and before the appearance of an IDR picture is specified as a seek time, the stream data recording device enables specifying a position where the unreceivable section ends and starting playback from the specified position, and preventing playback from being interrupted when reaching an unreceivable section a few seconds after the playback starts. Accordingly, playback in correspondence with a seek time can be performed without causing feelings of discomfort or discord in the user.

BRIEF DESCRIPTION OF THE DRAWINGS

FIG. 12 shows a bit assign when section information of unreceivable sections is implemented with use of a sequence table;

FIG. 16A is an exemplary screen display presenting to a user that an unplayable section exists in the recorded stream data; FIG. 16B is another exemplary screen display presenting to the user that the unplayable section exists; FIG. 16C is an exemplary screen display presenting to the user a total playback time when recording was scheduled; and FIG. 16D is an exemplary display presenting sections that can and cannot be designated as jump destinations when requesting the designation of a jump destination;

FIG. 17A shows a typical example of the stream data playback apparatus 203 displaying an image that indicates playback status, and FIG. 17B is an exemplary display method of the image indicating the playback status;

FIG. 19 is an example of a sequence table used to specify a section to which a seek time belongs;

DESCRIPTION OF THE CHARACTERS

Figure 1:
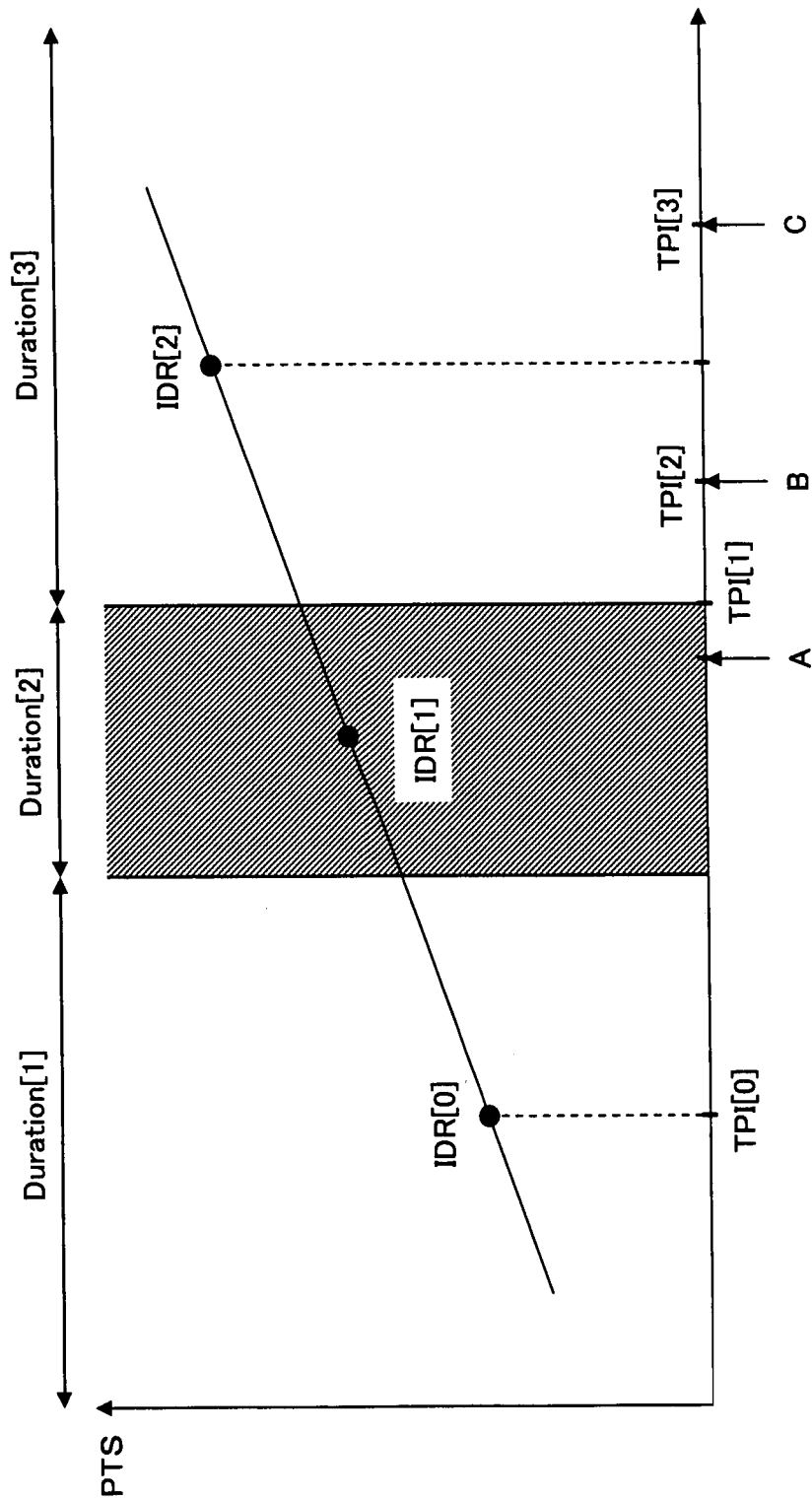
FIG. 1 shows a relationship between seek times and playback start positions when a portion of stream data is missing during reception and recording, according to a conventional technique.

101 stream reception/analysis unit
102 missing portion detection unit
103 section information generation unit
104 time counter unit
105 recording unit
111 user input unit 112 section information acquisition unit
113 playback starting position judgment unit
114 read unit
115 stream data acquisition unit
116 playback unit,
117 status display unit
118 read/write unit
121 unplayable judgment unit
122 section information update unit
123 data interpolation unit
132 missing portion information extraction unit
201 stream data recording apparatus
203 stream data playback apparatus
204 stream data recording/playback apparatus
205 stream data recording apparatus
206 stream data playback apparatus
210 stream data recording apparatus
220 stream data editing apparatus

BEST MODE FOR CARRYING OUT THE INVENTION

Embodiments of the present invention are described below with reference to the drawings.

Embodiment 1

Figure 2:
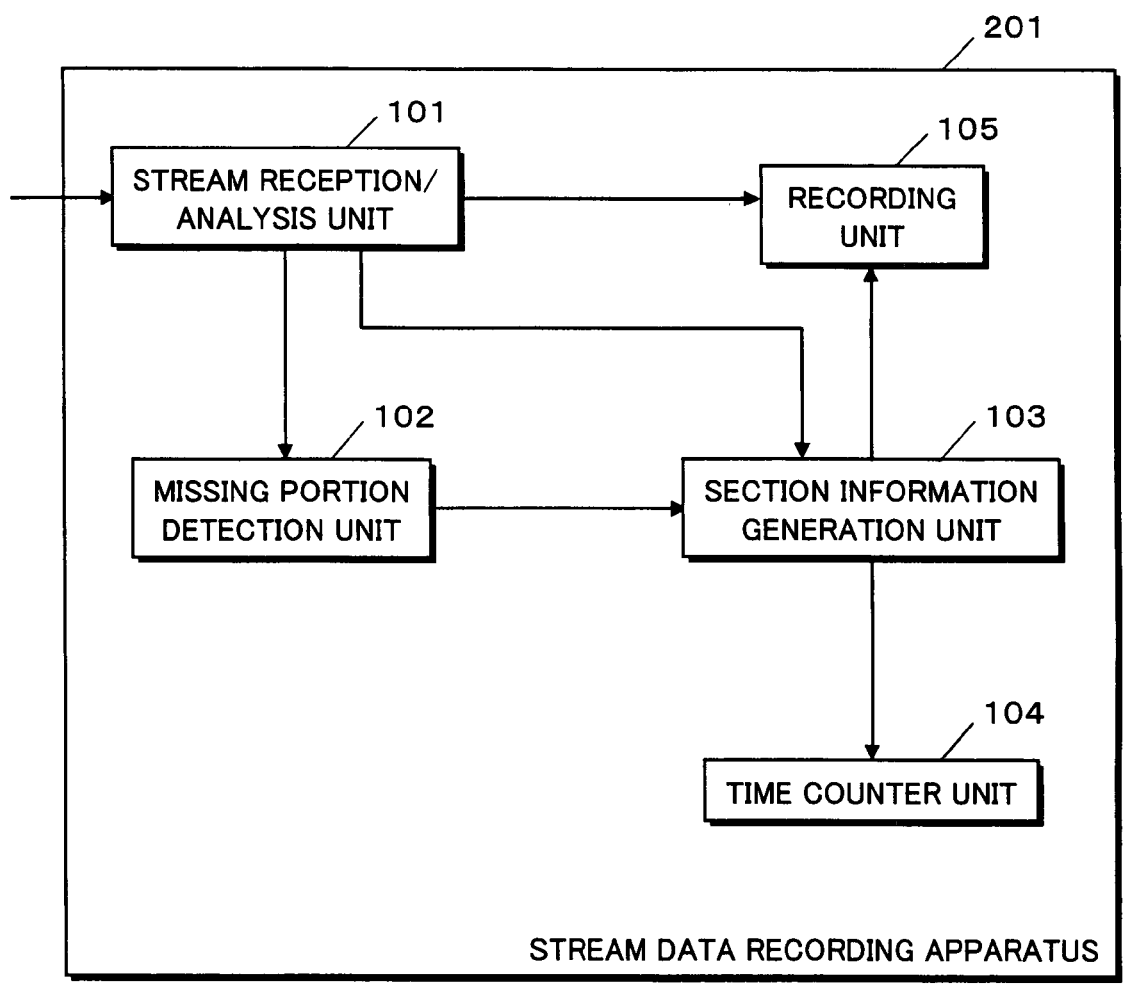
FIG. 2 is a block diagram showing a functional structure of a stream data recording apparatus pertaining to embodiment 1 of the present invention.

FIG. 2 is a block diagram showing a structure of a stream data recording apparatus 201 pertaining to embodiment 1 of the present invention.

The stream data recording apparatus 201 includes a stream reception/analysis unit 101, a missing portion detection unit 102, a section information generation unit 103, a time counter unit 104, and a recording unit 105.

The stream reception/analysis unit 101 receives a digital broadcast signal from a tuner, and after performing demodulation processing and error correction processing and converting the digital broadcast signal to a TS, extracts and outputs TS packets that include a PID (Packet Identifier) that identifies a program designated for recording by a user.

Figure 3:
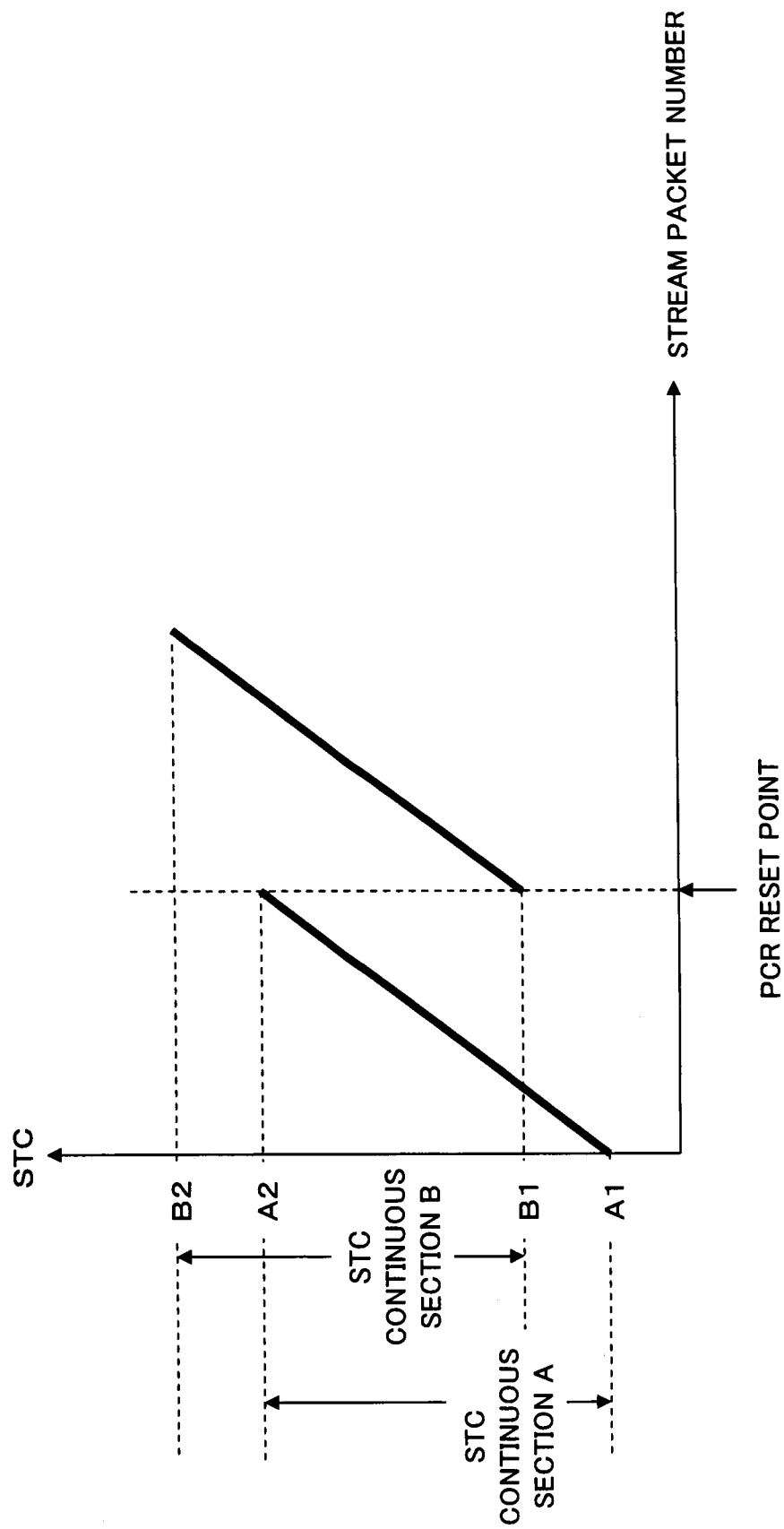
FIG. 3 shows a correspondence between a PCR reset and an STC.

In a TS, there are cases in which a PCR for performing synchronization between the sending side and the receiving side of a digital broadcast signal is reset at an arbitrary timing according to circumstances on the sending side, and the receiving side, as shown in FIG. 3, needs to reset an STC (System Time Clock), which is a clock of the receiving side, in accordance with the PCR reset. To this end, the stream reception/analysis unit 101 extracts PCR (Program Clock Reference) information from the TS packets in TS packet extraction processing.

Figure 4A:
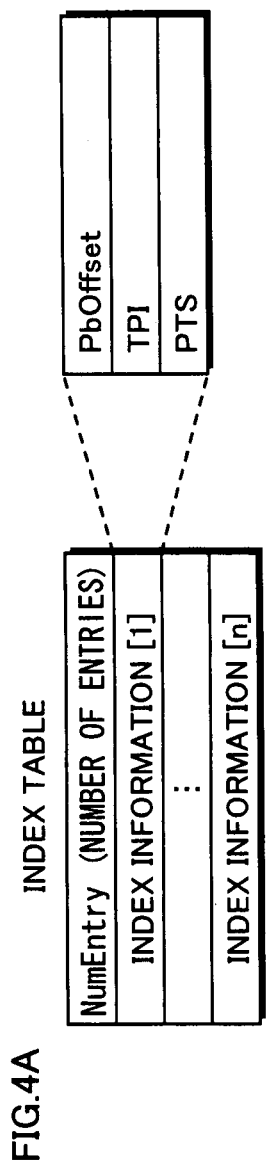
FIG. 4A shows an example of an index table.
Figure 4B:
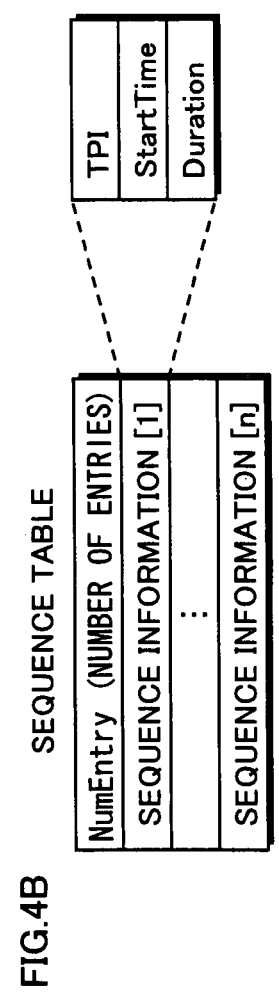
FIG. 4B shows an example of a sequence table.

Also, the stream reception/analysis unit 101 analyzes the TS packets to generate an index table shown in FIG. 4A and a sequence table shown in FIG. 4B.

The index table shown in FIG. 4A includes, for each IDR picture, 1) a "PbOffset" showing an offset time that passes from a stream data head to IDR picture playback, 2) a TPI of a TS packet corresponding to the head of a PES (Packetized Elementary Stream) packet including the IDR picture, and 3) a PTS of the IDR picture, which has been obtained by analyzing the TS packet and extracting the PTS from the PES header. Here, the TPI needs only be information specifying a packet location in the stream data, and in the present embodiment, numbers assigned sequentially starting from the head packet at the start of recording are used as the TPI.

Note that although the index table does not necessarily need to be generated when recording the stream data, creating the index table with use of TS packet analysis results when recording the stream data eliminates the need to analyze the stream data again in order to generate the index table during playback, thereby reducing the processing load when jumping to a playback time designated by the user. However, this does not necessarily apply to a case in which the received stream data is in a non-TS data format such as a PS (Program Stream).

The sequence table shown in FIG. 4B includes, for each stream data section for which the missing portion detection unit 102 has detected that a TS packet included therein is missing a portion (hereinafter referred to as "continuous reception section"), 1) a TPI of a section head packet, 2) a "Start Time" showing the PTS of the section head, and 3) a "duration" showing how long the section is. Note that a sequence table may be generated that includes sequence information for every STC continuous section having a continuous STC rather than for every continuous reception section. Another format may also be adopted for the sequence information, provided that a position in the stream data and duration of the section can be understood. For example, the PTSs at the beginning and end of the section can be used as information showing the duration of the section.

The missing portion detection unit 102 detects that a TS packet is missing a portion due to, for example, a degradation in the reception conditions of the digital broadcast signal, and notifies the stream reception/analysis unit 101 and the section information generation unit 103. Missing-portion detection is processing for detecting a missing portion detection starting point at which a missing portion occurs after a state in which stream data has been received normally and a disruption in continuity occurs in the stream data to be recorded, and a missing portion detection end point at which the stream data to be recorded becomes continuous again when normal stream data reception is possible after the missing portion occurred in the received data. The missing portion detection unit 102 detects the missing portion detection start point and the missing portion detection end point by acquiring a signal reception level from the stream reception/analysis unit 101 and judging whether the reception level enables normally performing restoration processing of the stream data. Specifically, CN and SN values, the presence or absence of uncorrectable errors, or the like may be used to detect a continuity disruption based on a reception level.

Note that the missing portion detection unit 102 may use another method to detect the missing portion detection start point and the missing portion detection endpoint. For example, the missing portion detection start point and the missing portion detection end point can be detected by eliciting from the stream reception/analysis unit 101 whether header information analysis errors exist when acquiring TS packets that include a PID to be recorded. Further possible methods include acquiring a TS packet including a PID to be recorded from the stream reception/analysis unit 101, and detecting the missing portion detection start point and the missing portion detection end point by analyzing payload information.

Specifically, synchronized byte values included in the headers of the TS packets, bit values displaying TS errors, PID values, adaptation field length, OPCR values, TS private data length, continuity counter values, packet start code prefix values contained in PES packet headers, stream ID values, PES header length, PTS values, DTS values, ECM values of PSI/SI information, EMM values, and so on may be used for detecting continuity disruptions by analyzing TS packet header information and payload information.

The section information generation unit 103 generates section information including time information specifying durations of unreceivable sections including sections in which the TS packet is missing a portion, and position information specifying a position in the stream data where the missing portion occurred. Note that the section information generation unit 103 may generate section information for an unreceivable section if the time from the missing portion detection start to the missing portion detection end is greater than or equal to a predetermined threshold.

Figure 5:
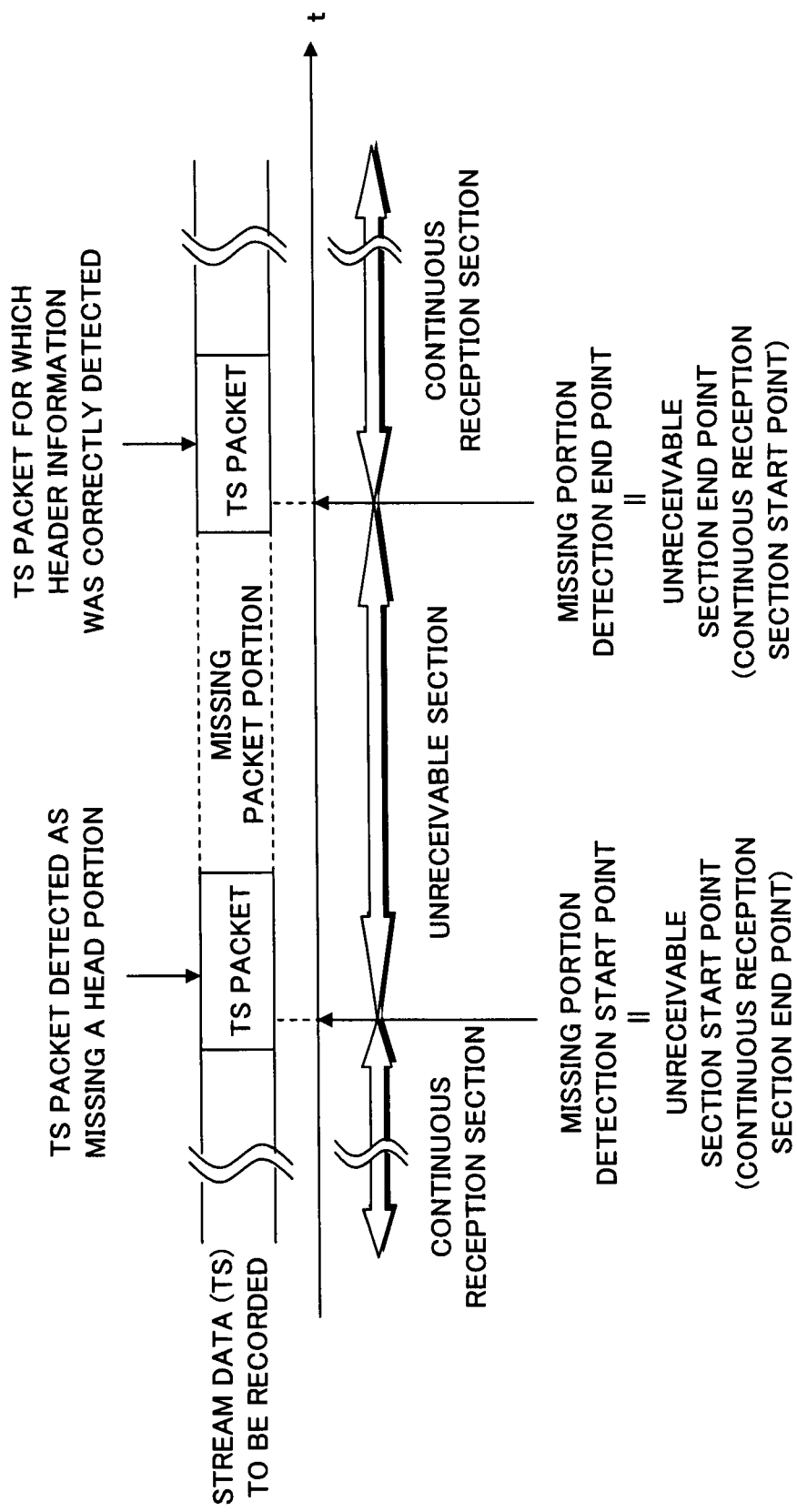
FIG. 5 shows a correspondence between a missing portion of stream data and an unreceivable section.
Figure 6:
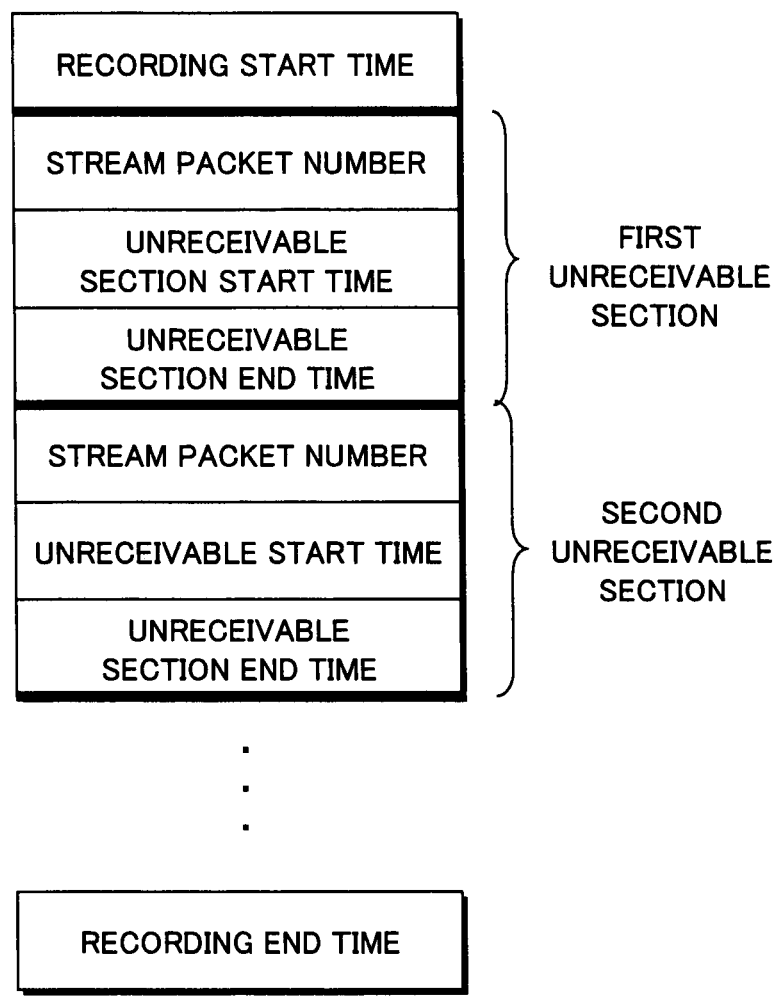
FIG. 6 shows a data structure of section information according to embodiment 1.

During generation of the section information, as shown in FIG. 5, the section information generation unit 103 sets the point at which the missing portion detection start point was notified by the missing portion detection unit 102 as the unreceivable section start point, acquires time information from the time counter unit 104, sets the point at which the missing portion detection end point was notified by the missing portion detection unit 102 as the unreceivable section end point, thus generating time information specifying the duration of the unreceivable section. Also, a TPI of a TS packet that is received normally when the unreceivable section has ended is used as position information specifying a stream data position that corresponds to an unreceivable section. FIG. 6 shows a data structure of section information according to embodiment 1.

Note that after the recording unit 105 finishes recording the stream data, the section information generation unit 103 may cause the recording unit 105 to collectively record the generated unreceivable section information, or cause the recording unit 105 to record the unreceivable section information separately each time a continuity disruption notification from the missing portion detection unit 102 is received and the unreceivable section information is generated.

Specifically, an STC counter or the like is used as the time counter unit 104.

The recording unit 105 is, specifically, an apparatus that writes to a recording medium. The recording unit 105 records a TS and the sequence table and the index table output from the stream reception/analysis unit 101, and also records unreceivable section information generated by the section information generation unit 103 to the recording medium. For example, a flash memory, an SD card, a memory stick, HDD, various types of DVD media such as DVD-RAM, or various types of BD media such as BD-RE can be used as the recording medium.

This completes the description of the stream data recording apparatus 201 pertaining to the present embodiment.

The following describes the processing by which the stream data recording apparatus 201 generates and records section information of unreceivable sections to a recording medium.

Figure 7:
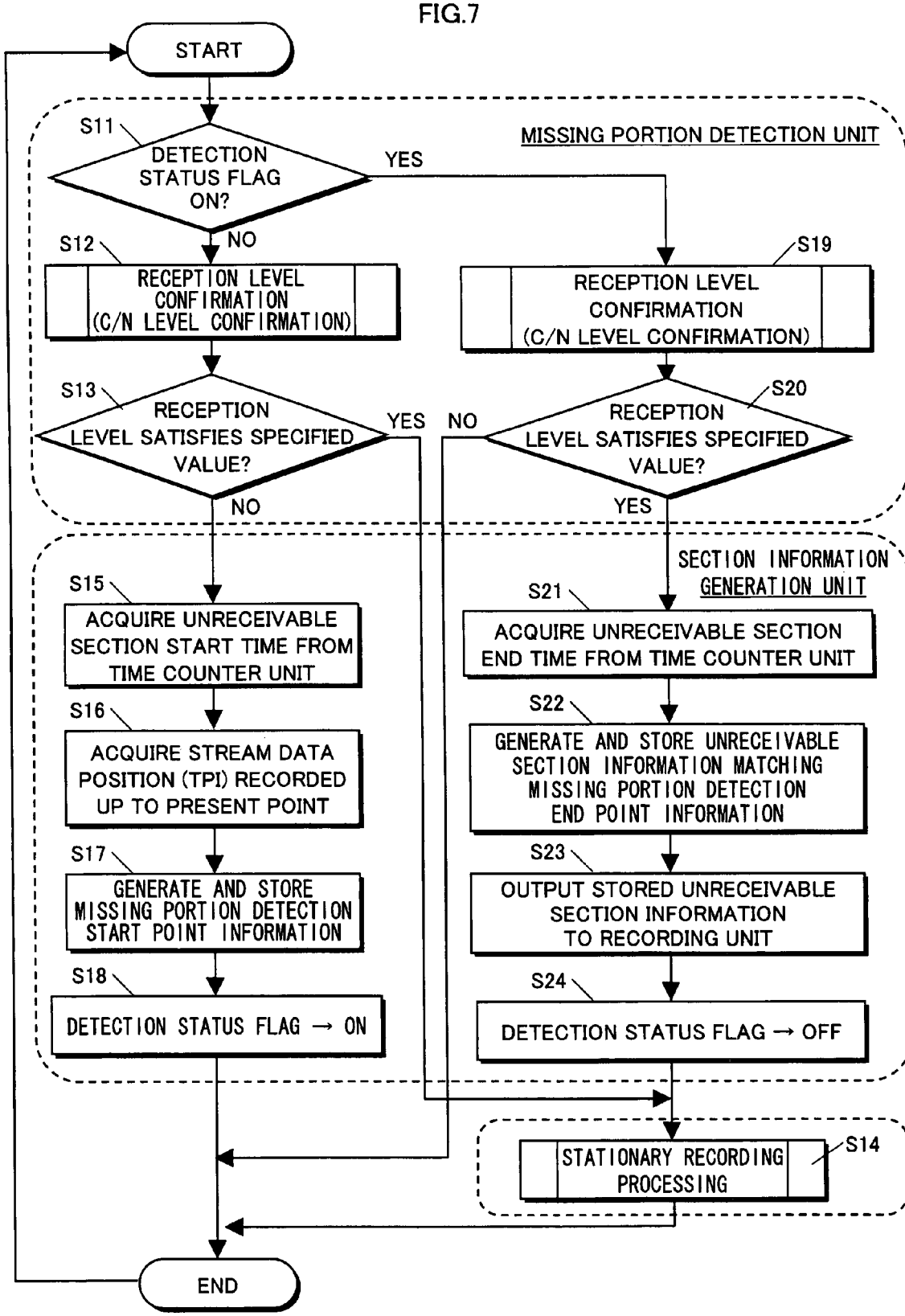
FIG. 7 is a flowchart showing an operational flow of the stream data recording apparatus pertaining to embodiment 1.

FIG. 7 is a flowchart showing an operational flow of the stream data recording apparatus of embodiment 1.

When the stream data recording starts, the missing portion detection unit 102 generates a detection status flag showing whether a missing portion of the stream data is currently being detected in an area included in a memory of the stream data recording apparatus 201, and performs management in accordance with the detection status flag.

Since the detection status flag is set to OFF (S11:NO) in an initial status, when normal stream data recording starts, the stream data recording apparatus acquires a CN value showing a reception level from the stream reception/analysis unit 101 (S12), and if the CN value is greater than or equal to a specified value and a TS packet has been acquired normally (S13:YES), the stream data output from the stream reception/analysis unit 101 is recorded by the recording unit 105 (S14).

Here, if the TS packet has been recorded normally by the recording unit 105, a recording success is notified to the stream reception/analysis unit 101, and the TPI is incremented.

However, if the CN value acquired in S12 is not greater than or equal to the specified value (S13: NO), the missing portion detection unit 102 notifies a missing portion detection start to the section information generation unit 103.

The section information generation unit 103 that received the notification acquires an unreceivable section start time and TPI in the processing of S15 and S16, and upon temporarily storing missing portion detection start point information made up of these pieces of information in the area included in a memory of the stream data recording apparatus 201 (S17), sets the detection status flag to ON (S18). Note that although in the present embodiment, a TS packet whose data is irregular since the CN value is not greater than or equal to the specified value is not recorded to the recording medium, the present invention can also be applied to a case in which, if the CN value is not greater than or equal to the specified value and the processing from S15 to S18 is executed, the TS packet whose data is irregular is recorded to the recording medium. Here, in a case in which the TS packet whose data is irregular is not recorded to the recording medium, the TPI is not updated, and if the TS packet whose data is irregular is recorded to the recording medium, incrementing the TPI in accordance with a number of recorded packets is necessary.

If the detection status flag is ON (S11:YES), the missing portion detection unit 102 acquires a CN value (S19), and judges whether the CN value is greater than or equal to a specified value (S20), and while the CN value continues to be less than the specified value (S20:NO), the processing of S1, S19, and S20 is repeated.

If the CN value is greater than or equal to the specified value and normal acquisition of a TS packet becomes possible during S20 processing (S20:YES), the missing portion detection unit 102 notifies the section information generation unit 103 of an end of detecting a missing portion.

Upon receiving the notification, the section information generation unit 103 acquires an unreceivable section end time (S21), generates section information for the unreceivable section from the missing portion detection start point information and unreceivable section information temporarily recorded in the area included in the memory in S17 (S22), and upon causing the recording unit 105 to record the generated section information (S23), sets the detection status flag to OFF (S24). Thereafter, the recording unit 105 records the stream data output received normally by the stream reception/analysis unit 101 (S14).

This completes the description of the processing performed by the stream data recording apparatus 201 in order to generate and record the section information of unreceivable sections to the recording medium.

According to this structure, time information indicating the duration of an unreceivable section including a missing portion in the stream data and position information indicating a position in the stream data of the unreceivable section are generated by the section information generation unit 103 as section information, and recording the unreceivable section information along with the TS to the recording medium enables correctly correlating the playback time of the distributed stream data and a continuous time from the recording start time of the recorded stream data. When the user designates a seek time and plays back the recorded stream data, this structure enables prevention of glitches such as starting playback from a different position from the one specified by the user, error data output that contains noise, etc.

Note that in embodiment 1, since the missing portion of the stream data is managed as data, an unreceivable section is defined as including a missing portion. However, the unreceivable section and the missing portion need not be strictly in accordance with each other.

Figure 8:
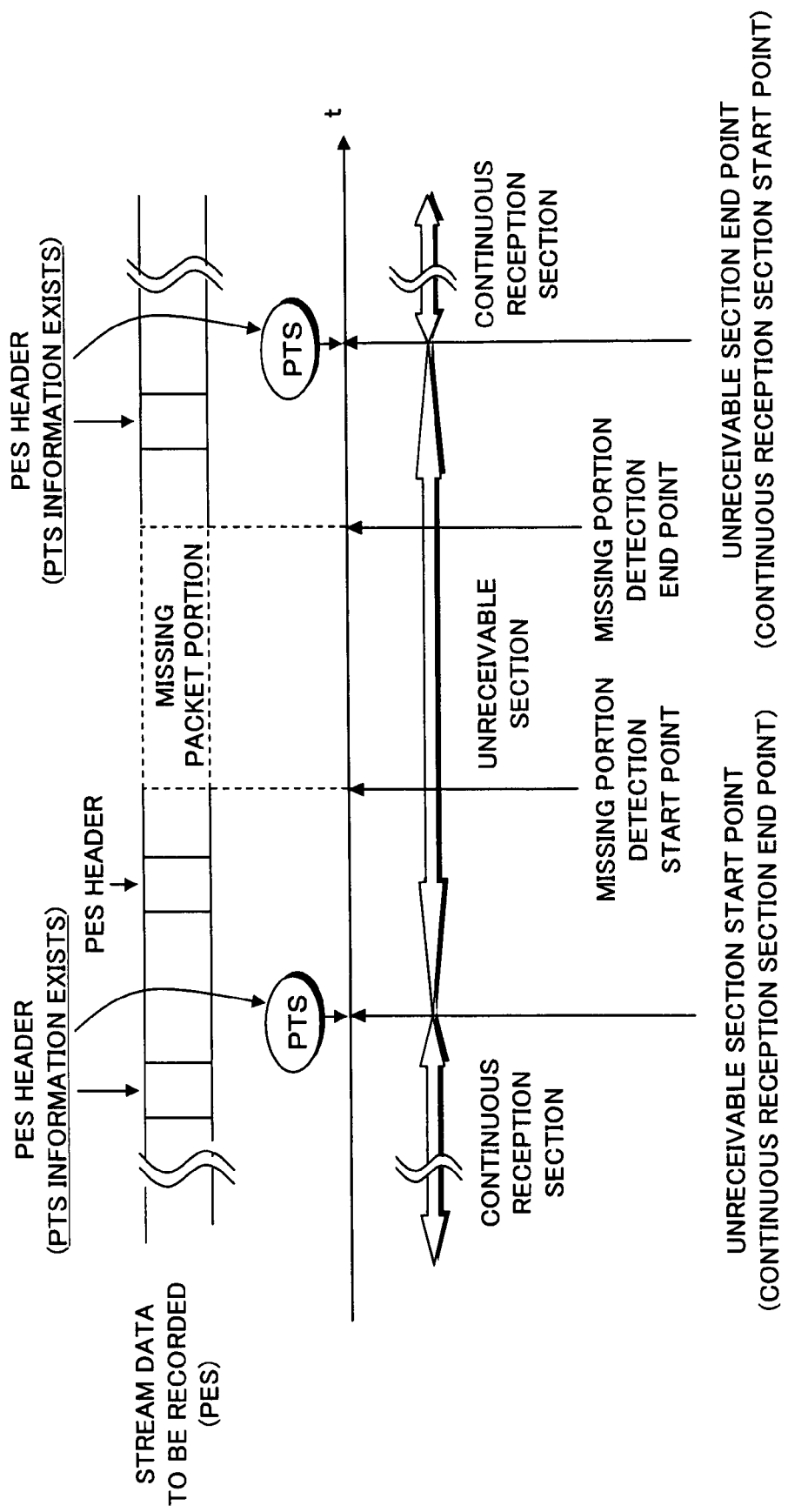
FIG. 8 shows another example of a correspondence between a missing portion the in stream data and an unreceivable section.

For example, in the example shown in FIG. 8, PTS information included in a PES header of data received normally that exists before the missing portion detection start point on a time axis is used as time information of the unreceivable start point. Also, PTS information included in a PES header of data received normally that exists before the missing portion detection start point on a time axis is used as time information of an unreceivable section end point. These pieces of PTS information included in PES headers can be acquired from the stream reception/analysis unit 101.

The following describes PTS information included in PES headers of data received normally that exists before the missing portion detection start point on a time axis.

Figure 9:
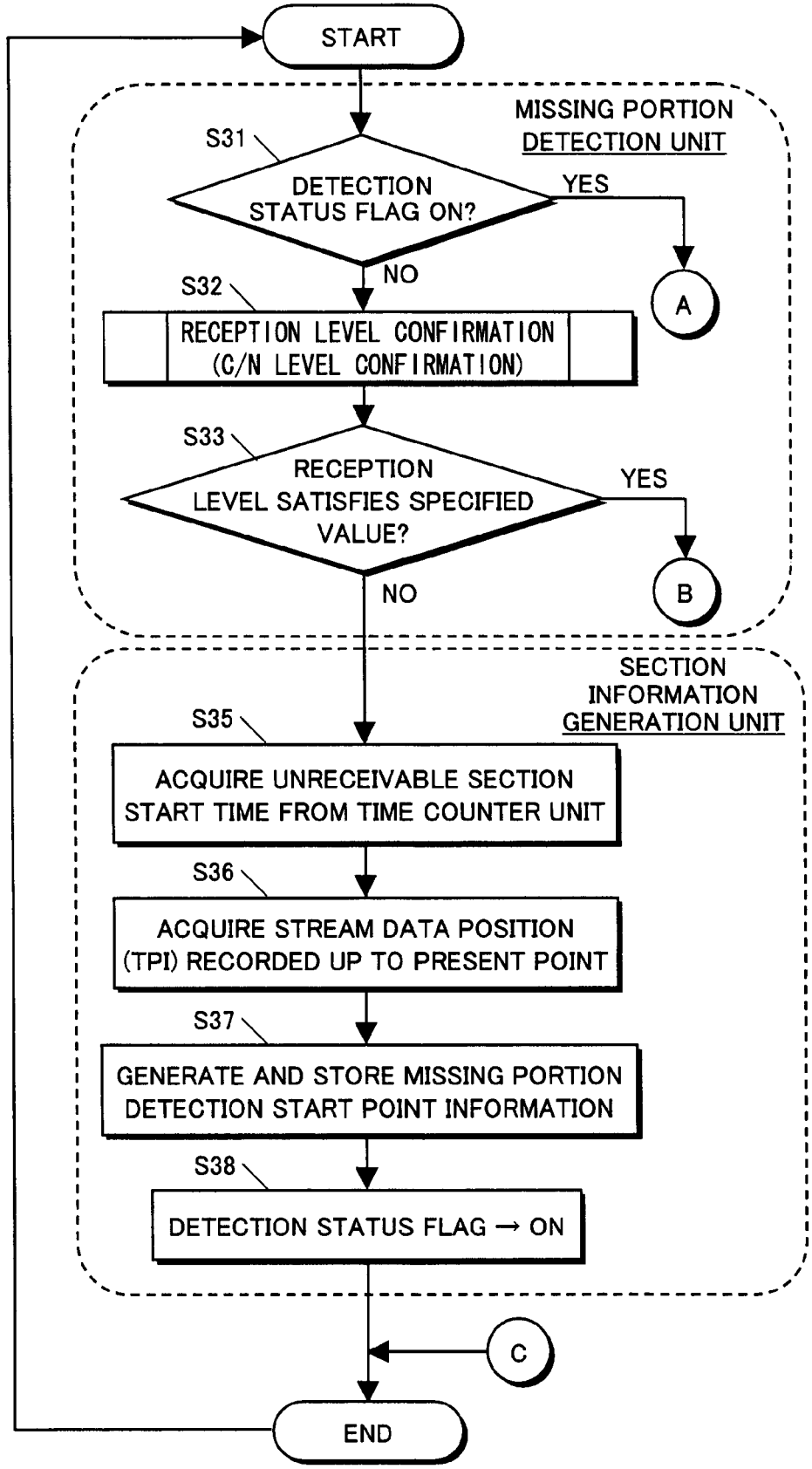
FIG. 9 is a flowchart showing an operational flow pertaining to recording section information that uses, as unreceivable section end time information, PTS information included in a PES header of data that has been received normally after missing portion detection has ended.
Figure 10:
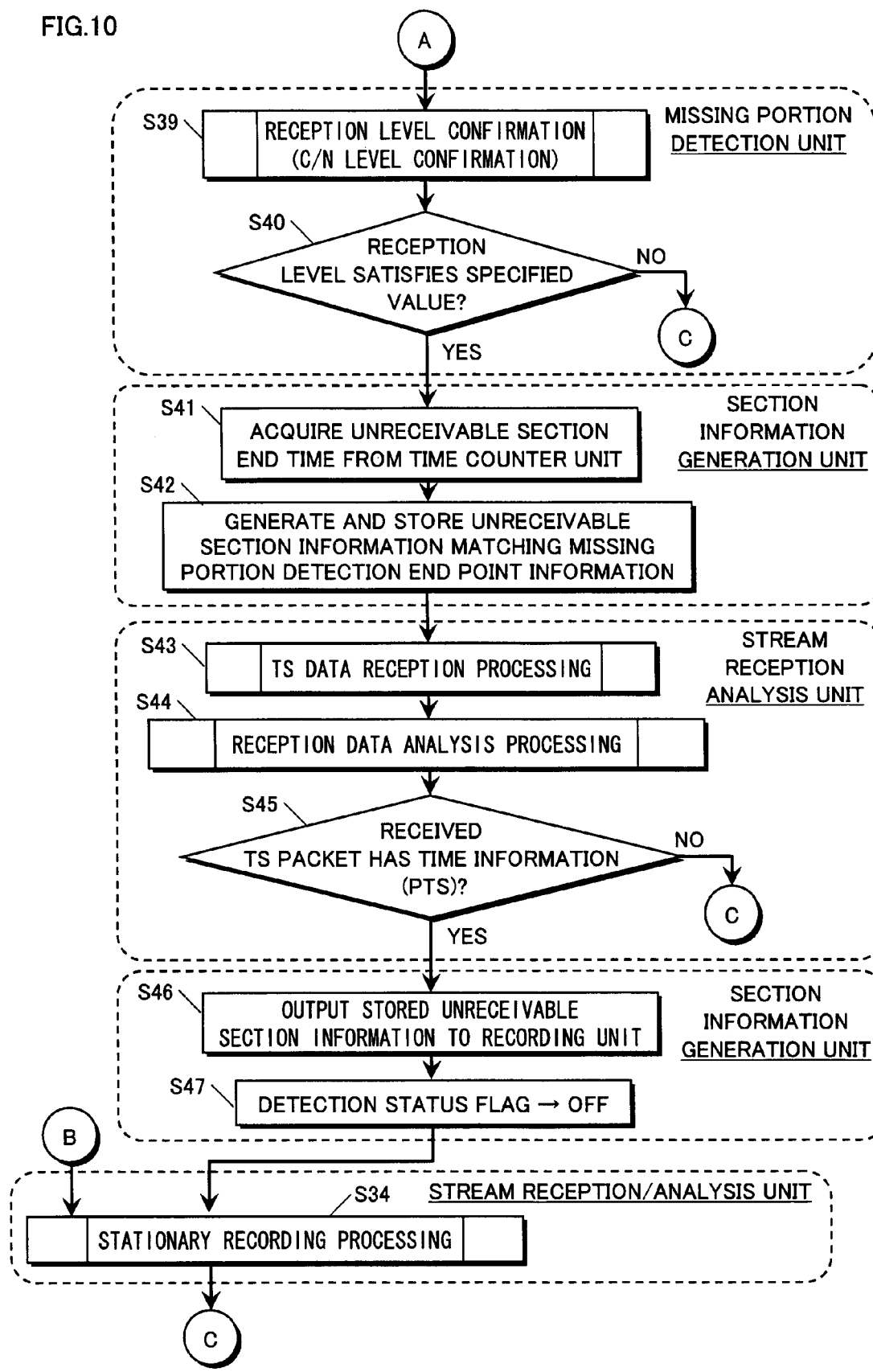
FIG. 10 is a flowchart showing the operational flow pertaining to recording section information that uses, as unreceivable section end time information, PTS information included in the PES header of data that is received normally following missing portion detection.

FIGS. 9 and 10 are flowcharts showing an operational flow of recording section information that uses, as unreceivable section end time information, PTS information included in a PES header of data that has been received normally after the missing-portion detection has ended.

In the operation flow shown in FIGS. 9 and 10, after the missing portion detection unit 102 notifies the section information generation unit 103 of the missing portion detection start, the missing portion detection start point information is generated in S35 to S38, and processing that temporarily records the missing portion detection start point information to the area in the memory is similar to the processing shown in FIG. 7.

However, after the missing portion detection unit 102 notifies the section information generation unit 103 of the missing portion detection end, the method in FIG. 10, S41 to S47 for determining the unreceivable section end time used as section information differs from the processing in FIG. 7 that causes the unreceivable section end point time to match the missing portion detection end point.

Specifically, an unreceivable section end time is acquired in S41 and S42, and processing that generates section information repeats until data including PTS information is received in S43 to S45. As a result, in S46, section information, which uses a time corresponding to the point at which the data including PTS information was received as the unreceivable section end time, is recorded to a recording medium.

This completes the description of processing regarding PTS information included in PES headers of data received normally that exists before the missing portion detection start point on a time axis.

Note that the present invention is not necessarily limited to using the data structure shown in FIG. 6 as information specifying the unreceivable section, provided that time information of when the missing portion occurred in the stream data and position information specifying the position in the stream data are included.

Figure 11:
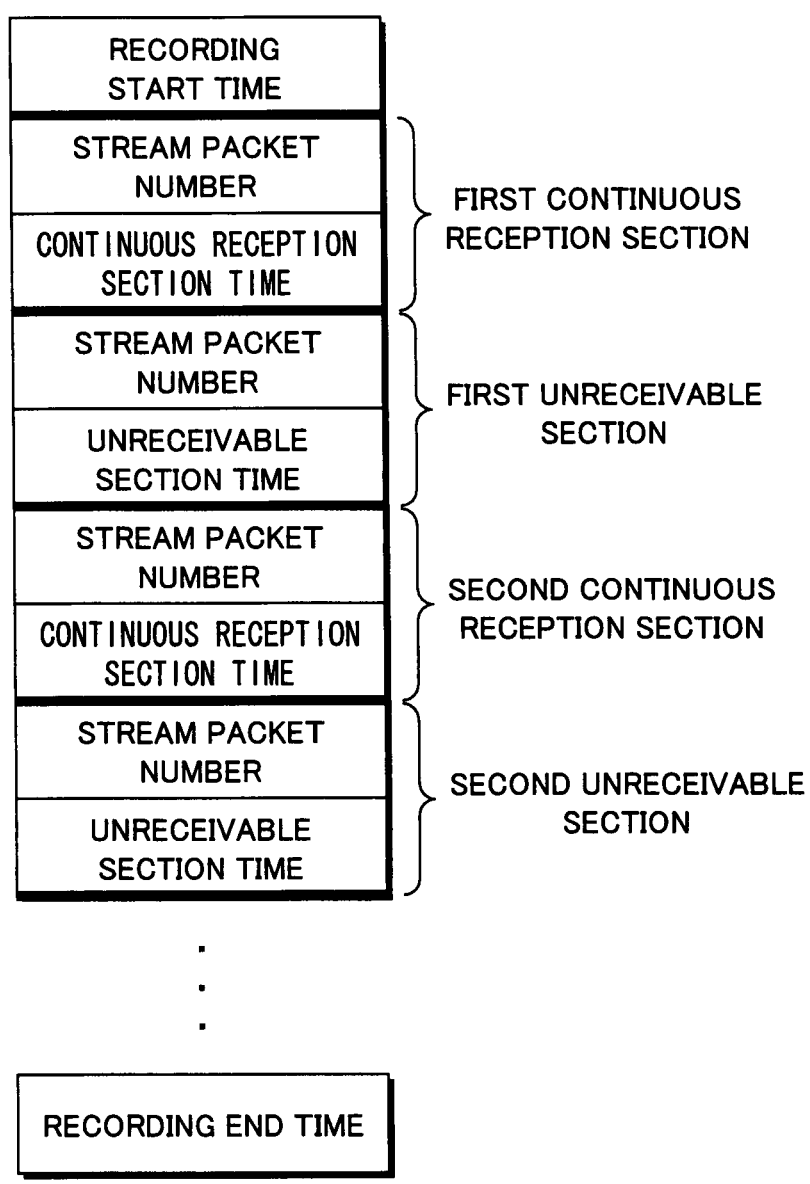
FIG. 11 shows another example of section information.

For example, the data structure shown in FIG. 11 may be used as section information. The data structure shown in FIG. 11 can be implemented so that section information of unreceivable sections is added to the sequence table, as shown in FIG. 12. In the sequence table of FIG. 12, an Entry Type indicating whether the corresponding section is a continuous reception section or an unreceivable section is added to the sequence information of each section, and if the corresponding section is an unreceivable section, the PTS at the section head is set to zero.

Note that if TS packets are recorded that include errors corresponding to unreceivable sections in the stream data, the TPI of the head TS packet is used as position information specifying the position of the unreceivable section in the stream data. However, if the TS packet corresponding to the unreceivable section is excluded from the stream data recording, the same information is used for position information that specifies the unreceivable section as the information set in the TPI of the next continuous reception section after the unreceivable section.

Note that FIG. 12 shows an example using Duration as time information specifying the duration of the unreceivable sections, and in a case of using a sequence table for section information of the unreceivable sections, a combination of a Start Time indicating a section start time and an End Time indicating a section end time may be used as the time information specifying the duration of the unreceivable sections. In this case, an STC value indicated by the time counter unit 104 at the start of the unreceivable section may be used as the Start Time, and an STC value indicated by the time counter unit 104 at the end of the unreceivable section may be used as the End Time. Furthermore, as another example of section information, a data structure shown in FIG. 13 may be used.

Note that although in embodiment 1, TPI is used as the position information specifying the position in the stream data corresponding to the unreceivable section, other information may be used as the position information. For example, instead of TPI, a file pointer of a file in which the stream data has been recorded, or a byte size from the head may be used. Also, the information correlating the stream data position and the time information with each other may be stored separately from the unreceivable section information, and a pointer to the information correlating the stream data position and the time information with each other may be used as the unreceivable section information. For example, if video data is compressed according to an MPEG standard, the data position of IDR pictures and time information of PTS information or the like may be stored as an index table, and a pointer to the index table and offset values from the head may be used as unreceivable section information to specify the stream data positions corresponding to unreceivable sections.

Also, the positions corresponding to unreceivable section start points or unreceivable section end points may be used as stream data positions corresponding to the unreceivable sections, and the correspondence need not be exact. In a case of using positions corresponding to unreceivable section start points or unreceivable section endpoints, effects can be achieved such as enabling matching the total playback time calculated from the unreceivable section time information to the total playback time of the stream data that is actually played back. Also, when there is not an exact correspondence between the stream data position information and the unreceivable section start point or end point, although the total playback time calculated from the unreceivable section time information does not exactly match the total playback time of the stream data that is actually played back, effects such as simplification of implementation are achieved.

Also, a playback quality level may be judged in accordance with the duration of the unreceivable sections, the total time of unreceivable sections included in a predetermined time period or a ratio thereof, frequency of missing portions, or numbers of TS packets including the recording-target PIDs in the unreceivable sections, a data size thereof, etc., and the playback quality level may be included in the unreceivable section information. The number of TS packets including the recording-target PIDs in the unreceivable section can be calculated with use of a continuity counter value of the TS packet header information. In a case of including the playback quality level information, playback according to decoding processing ability at the time of playback is possible. For example, in a case of judging the quality level according to three levels "high", "medium" and "low", if the decoding processing ability is low, a judgment is made that sections having levels "medium" and above are playable, while if the decoding processing ability is high, a judgment is made that in addition to the levels "medium" and "high", the level "low" sections are playable and playback processing can be performed. The threshold used in the judgment can either be stored in advance as a fixed value, or set by the user. Also, a threshold map for each program category may be stored. In this case, making the playable section threshold stricter for programs in the stream to be recorded that are more sound sensitive, such as music programs and talk shows, enables reducing user discomfort in accordance with the characteristics of the program when the recorded stream is played back.

Also, the playback quality level of the unreceivable section may be judged in accordance with a type of packet that is missing.

Also, for example in a case when there is a gap in serial numbers that are assigned to packets that are shown by PIDs to be audio data, it is possible to determine that the type of missing packet is audio. With use of this determination, the playback quality level of the unreceivable section can be judged in accordance with the type of packet that is missing, and the result may be added to the playback quality level information as unreceivable section information. For example, the playback quality level of unreceivable sections may be set according to three categories, "video enabled" in which only TS packets of audio data are missing, "audio enabled" in which a missing portion exists in the stream data but there are no gaps in the serial numbers of the audio data, and "disabled" in which both TS packets of video data and TS packets of audio data are missing. In this case, a section whose level is "audio enabled" is judged to be playable on a player that only performs audio playback, and playback processing can be executed.

Figure 14:
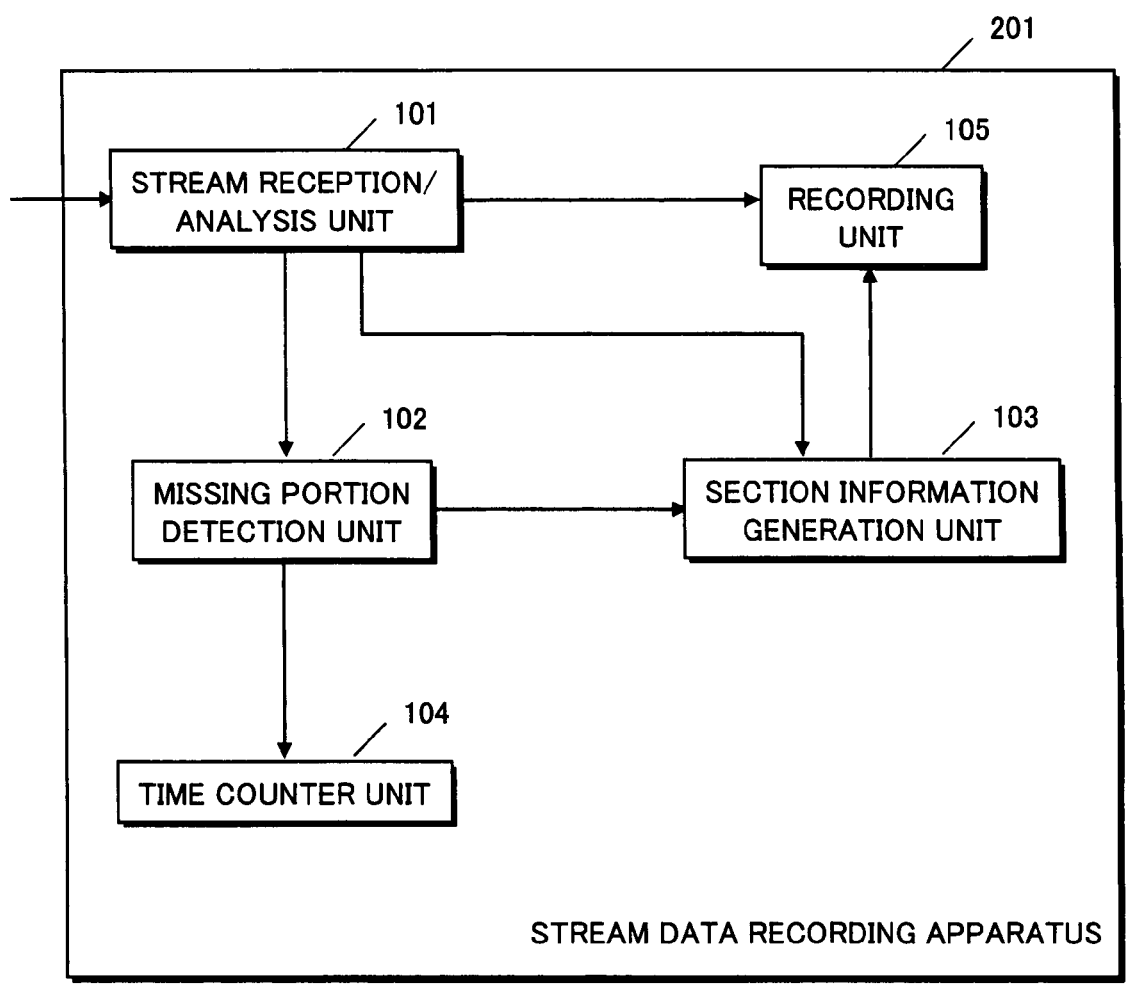
FIG. 14 is a block diagram showing a variation of the stream data recording apparatus pertaining to embodiment 1.

Note that although in embodiment 1, the section information generation unit 103 acquires the missing portion detection start point and the missing portion detection end point time information from the time counter unit 104, as shown in FIG. 14, after detecting the missing portion detection start point and the missing portion detection end point, the missing portion detection unit 102 may acquire the time from the time counter unit 104, and notify the time information to the section information generation unit 103 along with the continuity disruption notification. This enables obtaining the effect of reducing the difference between the time information and timing that was actually detected.

Following is a description of a stream data playback apparatus 203 that designates a seek time and plays back stream data from a recording apparatus on which has been recorded stream data and section information of unreceivable sections.

Figure 15:
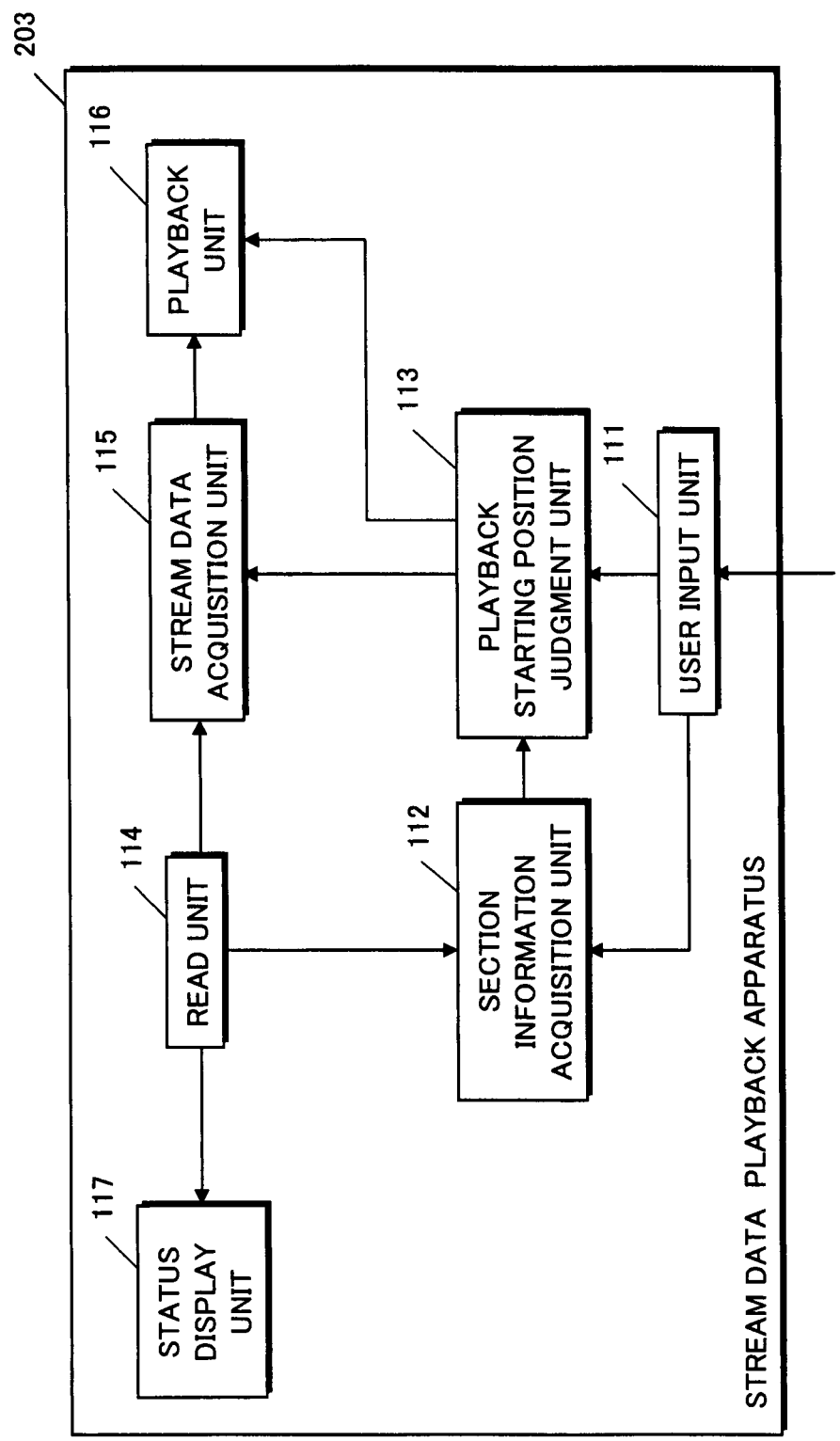
FIG. 15 is a block diagram showing a functional structure of the stream data playback apparatus pertaining to embodiment 1.

FIG. 15 is a block diagram showing a functional structure of a stream data playback apparatus according to embodiment 1.

The stream data playback apparatus 203 includes a user input unit 111, a section information acquisition unit 112, a playback starting position judgment unit 113, a read unit 114, a stream data acquisition unit 115, a playback unit 116, and a status display unit 117.

The user input unit 111 receives the stream data to be played back and a seek time instruction from the user, notifies the stream data information to the section information acquisition unit 112, and notifies the seek time information to the playback starting position judgment unit 113.

The read unit 114 reads stream data, the sequence table, and the index table from the recording medium. The sequence tables read here are formatted as shown in FIG. 12, and include section information of the continuity disrupted sections and the unreceivable sections.

Upon acquiring the stream data information to be played back from the user input unit 111, the section information acquisition unit 112 acquires the corresponding sequence table and the corresponding index table from the read unit 114, and outputs the acquired tables to the playback starting position judgment unit 113.

The playback starting position judgment unit 113 acquires the seek time information from the user input unit 111, and upon acquiring the sequence table and the index table from the section information acquisition unit 112, judges a TPI of a TS packet where decoding processing is started in a case of playback from a designated seek time and a PTS at which output of the decoded video and audio data to the speaker and display is started (hereinafter referred to as a "playback start time"), notifies the TPI to the stream data acquisition unit 115, and notifies the playback start time to the playback unit 116.

When notified of the TPI, the stream data acquisition unit 115, acquires the stream data read by the read unit 114 by referencing the position shown by the TPI.

Upon acquiring the playback start time from the playback starting position judgment unit 113 and the stream data from the stream data acquisition unit 115, the playback unit 116 performs separation and decoding processing on the audio and video data. Thereafter, the playback unit 116 lip-synchronizes the audio and video data and outputs the audio and video data to a speaker and a display that are not depicted in the drawings. Furthermore, if the playback processing reaches a position at which an unreceivable section is shown in the sequence table, the playback unit 116 continuously displays a still frame of the last decoded frame on a display for the duration of the unreceivable section. Note that when playback reaches a position that is indicated to be in the unreceivable section, instead of displaying a still frame of the last decoded frame, a darkened display or a display of another color may be displayed during the duration of the unreceivable section. Alternatively, when playback processing reaches a position that is indicated by the sequence table to be an unreceivable section, a TPI and a PTS of a continuous reception section immediately following the unreceivable section may be acquired from the sequence table, and the playback position may jump ahead to the next continuous reception section by considering the acquired TPI as a decoding start position, and the PTS as the playback start time.

The status display unit 117 generates, and outputs to a monitor, a screen displaying to the user the existence of unplayable sections in the recorded stream data in accordance with the sequence table read by the read unit 114. Specifically, in display processing, as shown in FIG. 16A, the status display unit 117, for example, displays continuous reception sections and unreceivable sections in proportion to durations thereof on a bar object showing the entire stream data. Alternatively, as shown in FIG. 16B, the display may be performed on a bar object showing the positions of the unreceivable sections and the lengths of playable stream data. As another example, shown in FIG. 16C, a total playback time when playback was scheduled and a playable time of the stream data that was actually recorded may be displayed to the user. As shown in FIG. 16D, when requesting a jump destination from the user, the status display unit 117 further generates and outputs to the monitor an image showing sections in which a jump destination can/cannot be designated on a single bar object.

Also, during playback of the stream data, the status display unit 117 generates, and outputs to the monitor, images indicating the playback status. FIG. 17A shows a typical example of the stream data playback apparatus 203 displaying an image that indicates playback status. During stream data playback, decoded playback images are displayed on a video output portion 10a in a monitor 10 of the stream data playback apparatus 203, and information indicating the playback status generated by the status display unit 117 is displayed on a status display portion 10b. The information indicating the playback status displayed by the status display portion 10b includes a playback position display bar object 10c and a playback time display 10d. Below, an image display method for displaying playback statuses is described with use of an example case in which playback quality level information has been added to the unreceivable section information with use of three quality levels that correspond with types of missing packets, the three quality levels being "audio enabled", "video enabled" and "disabled". FIG. 17B is an exemplary display method of the image showing the playback status.

The playback position display bar object 10c is a bar object that shows the length of the entire stream data, and the continuous reception sections and the unreceivable sections are segmented in accordance with the positions and lengths of the sections. The sections that are segmented on the bar object are displayed in contrasting colors in accordance with the type and quality level of each section. Specifically, a section 10e indicating a continuous reception section is displayed in green, a section 10f indicating an unreceivable section whose quality level is either "video enabled" or "audio enabled" is displayed in orange, and a section log indicating an unreceivable section whose quality level is "disabled" is displayed in red. Furthermore, a playback position display bar object 10e facilitates understanding the status of the current playback position by displaying a thick frame starting from the left side of the bar object that corresponds to an amount of completed playback.

The playback time display 10d is a character string indicating the current playback time and the playing time of the entire stream data displayed on a single line, and is displayed when the current playback time reaches a unreceivable area in which the quality level is "audio enabled" or "disabled" and the video output portion 10a becomes dark. Note that similarly to the playback position display bar object 10c, the display colors of the playback time display 10d may be changed in accordance with the quality level.

Furthermore, when the quality level is "disabled" and the playback position reaches an unreceivable section whose duration is greater than or equal to a predetermined time (10 seconds or the like), the video output portion 10a may display a warning image such as a popup 10h or an icon. This type of warning alerts the user that the playback interruption is of a long duration, thus enabling the user to take an appropriate action such as skipping ahead.

This completes the description of the structure of the stream data playback apparatus 203.

Figure 18:
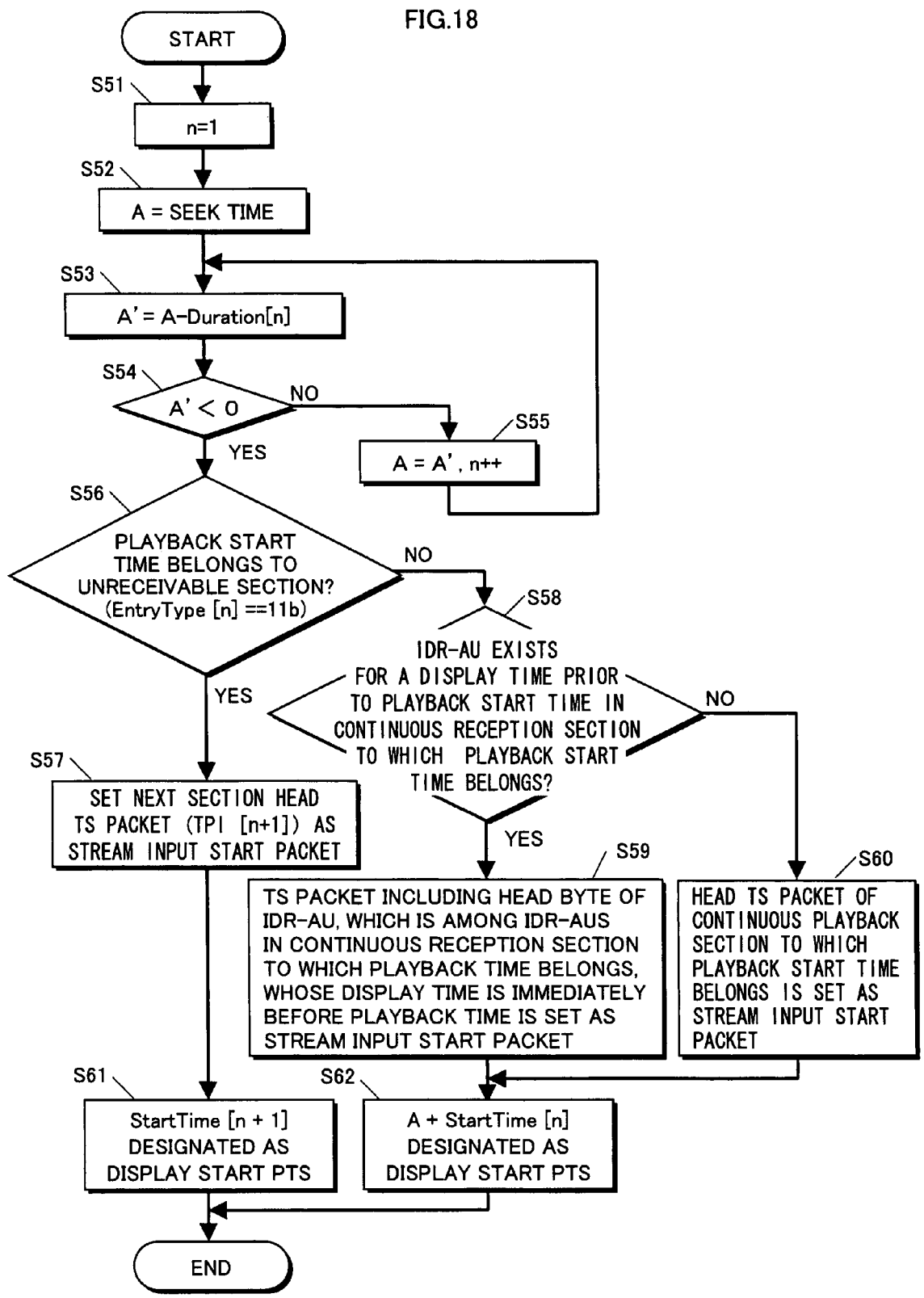
FIG. 18 is a flowchart showing an operational flow of the stream data playback apparatus according to embodiment 1.
Figure 20:
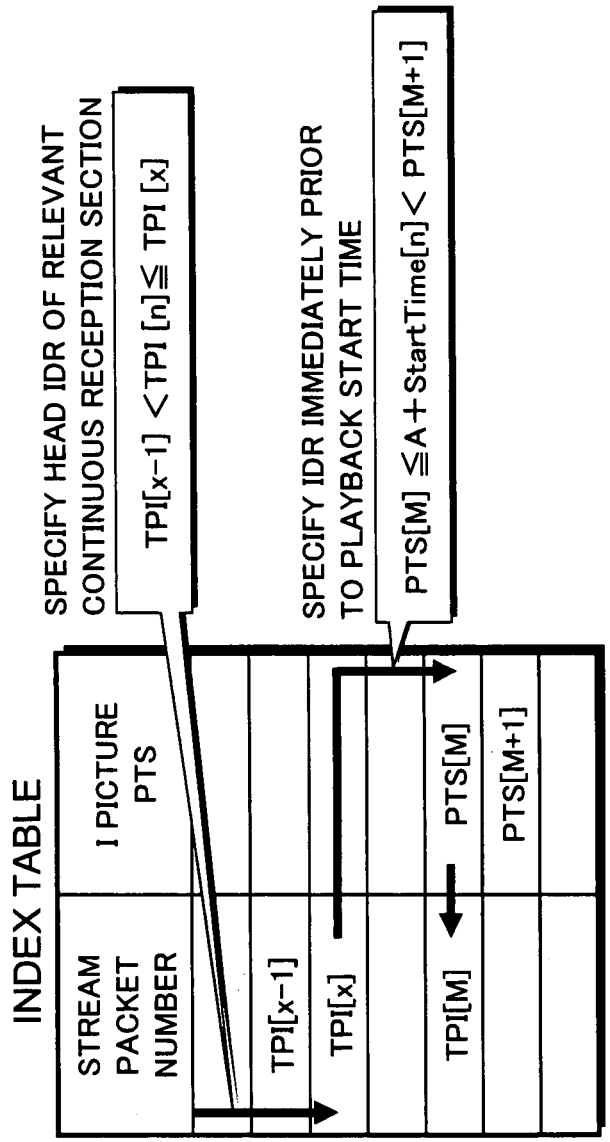
FIG. 20 shows a procedure for specifying a head packet of an IDR-AU that immediately precedes a seek time.

Next, the following describes processing by which the playback starting position judgment unit 113 judges with which TS packet to start decoding processing according to the seek time, with reference to FIGS. 18, 19 and 20.

FIG. 18 is a flowchart showing an operational flow of the stream data playback apparatus according to embodiment 1.

First, in S51 to S55, the playback starting position judgment unit 113 uses the sequence table to determine which section the designated seek time belongs to. Here, as shown in FIG. 19, if a section n is a continuous reception section, a Start Time [n] is a starting PTS of the section N, and a Duration [n] indicates the duration of time that the section N continues, and if the section N is an unreceivable section, the Start Time [n] is zero, and the duration of N indicates the duration that the section N continues.

Specifically, when N is set to 1 and A is set to the seek time (S51, S52), the playback starting position judging unit 113 increments n and repeats the processing of S53 to S55 until a value of A', that is, the duration of the section N subtracted from A, becomes a negative number. In the processing above, when A' has become a negative number, N indicates the section N to which the seek time belongs, and A is a difference from the start of the relevant section.

Next in S56, the stream data playback apparatus judges whether the seek time is included in an unreceivable section. If the seek time is included in the unreceivable section (S56: YES), the stream data playback apparatus judges that the TPI of the head TS packet of the immediately following section (N+1) is the TPI of the TS packet from which decoding processing is to start in accordance with the seek time (S57), and instructs a decoder to use the section head PTS of the section (N+1) as the playback start time (S61). In the example shown in FIG. 19, if N is 2, a TPI [3] of a section 3 that is the immediately following section is acquired from the sequence table as a starting position of decoding processing, and a Start Time [3] is acquired from the sequence table as a playback starting time.

However, when the seek time belongs to a continuous reception section according to the judgment of S56, and in the example of FIG. 19, n is 1 or 3 (S56:NO), the stream data processing apparatus judges whether an IDR picture having a PTS whose time is before the designated seek time exists in the continuous reception section to which the seek time belongs (S58).

Specifically, the judgment of S58 is made by acquiring a TPI [n] that is the section head TPI of the section N from the sequence table of FIG. 19, and as shown in FIG. 20, by selecting a TPI [x] that satisfies TPI [x−1]<TPI [n]<=TPI [X], specifies a head IDR picture [x] of the section to which the seek time belongs.

Next, if the index table has registered therein an IDR picture [M] that satisfies PTS[M]<=A+StartTime[n]<PTS [M+1] and whose PTS indicates a later time than the PTS [x] of the IDR picture [x] of the head of the specified section, the stream data processing apparatus judges that an IDR picture exists whose PTS indicates a time before the designated seek time (S58:YES) In this case, the stream data processing apparatus selects the TPI [M] of the IDR picture [M] that is registered in the index data as the TPI of the TS packet from which decoding processing is to start in accordance with the seek time (S59), and instructs the decoder to use the sum of the Start Time [n] that is the starting time of the section n and the A that indicates the difference from the start of the relevant section (A+StartTime[n]) as the playback start time (S62).

If an IDR picture [M] that satisfies the above conditions has not been registered in the index table, the stream data processing apparatus judges that an IDR picture whose PTS indicates a time before the designated seek time does not exist in the continuous reception section to which the seek time belongs (S58:NO), selects the section head TPI of section [n] that is a continuous reception section to which the seek time belongs, that is, a TPI [n] that is registered in the sequence table of FIG. 19, as the TPI of the TS packet from which decoding processing is to start in accordance with the seek time (S60), and instructs the decoder to use the sum of the Start Time [n] that is the starting time of the section n and the A that indicates the difference from the start of the relevant section (A+StartTime [n]) as the playback start time (S62).

According to the above procedure, when the position A shown in FIG. 1 is designated as the seek time, decoding processing and monitor output are performed from the position of TPI [1] at which the unreceivable section has ended, and if a position B indicated in FIG. 1 is designated as the seek time, decoding processing occurs from the position of TPI [1] at which the unreceivable section has ended, and monitor output is performed from TPI [2]. Even in cases in which the positions A or B are designated as the seek time in this way, since playback does not start from the IDR [0] that is recorded immediately before the seek time, playback is not interrupted upon reaching an unreceivable section a few seconds after the playback start.

Furthermore, although when a position C shown in FIG. 1 is designated as the seek time and the playback position is determined with use of an index table only, monitor output is performed from the IDR [2] that is immediately before the seek time, the processing procedure described above enables playback processing to more accurately reflect the seek time, since monitor output occurs from the position of TPI [3] while starting decoding processing from IDR [2].

This completes the description of processing for judging, in accordance with the seek time, the TS packet from which decoding processing is to start.

Figure 21:
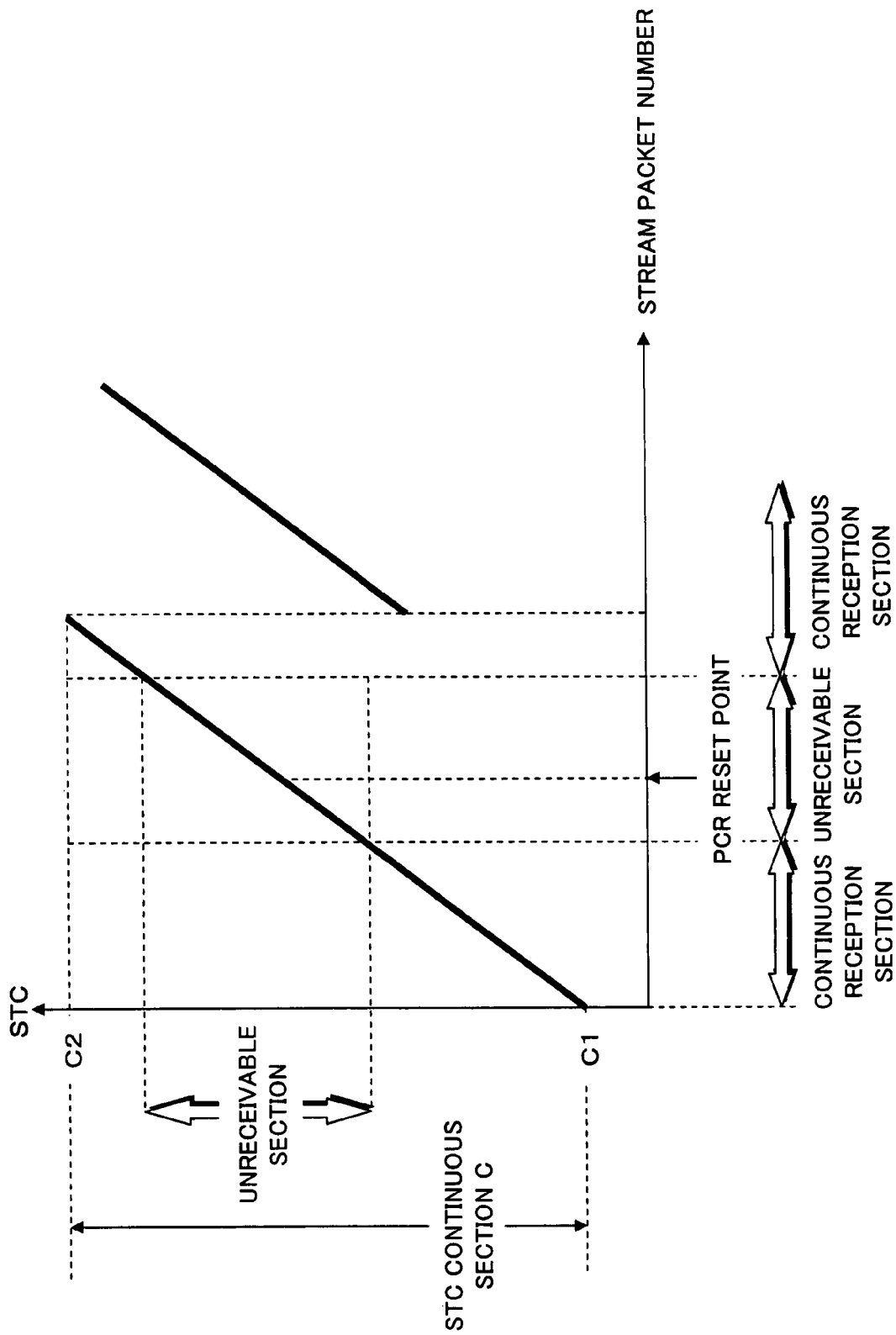
FIG. 21 shows STC movements when airwave reception conditions are poor when a PCR is reset.
Figure 22:
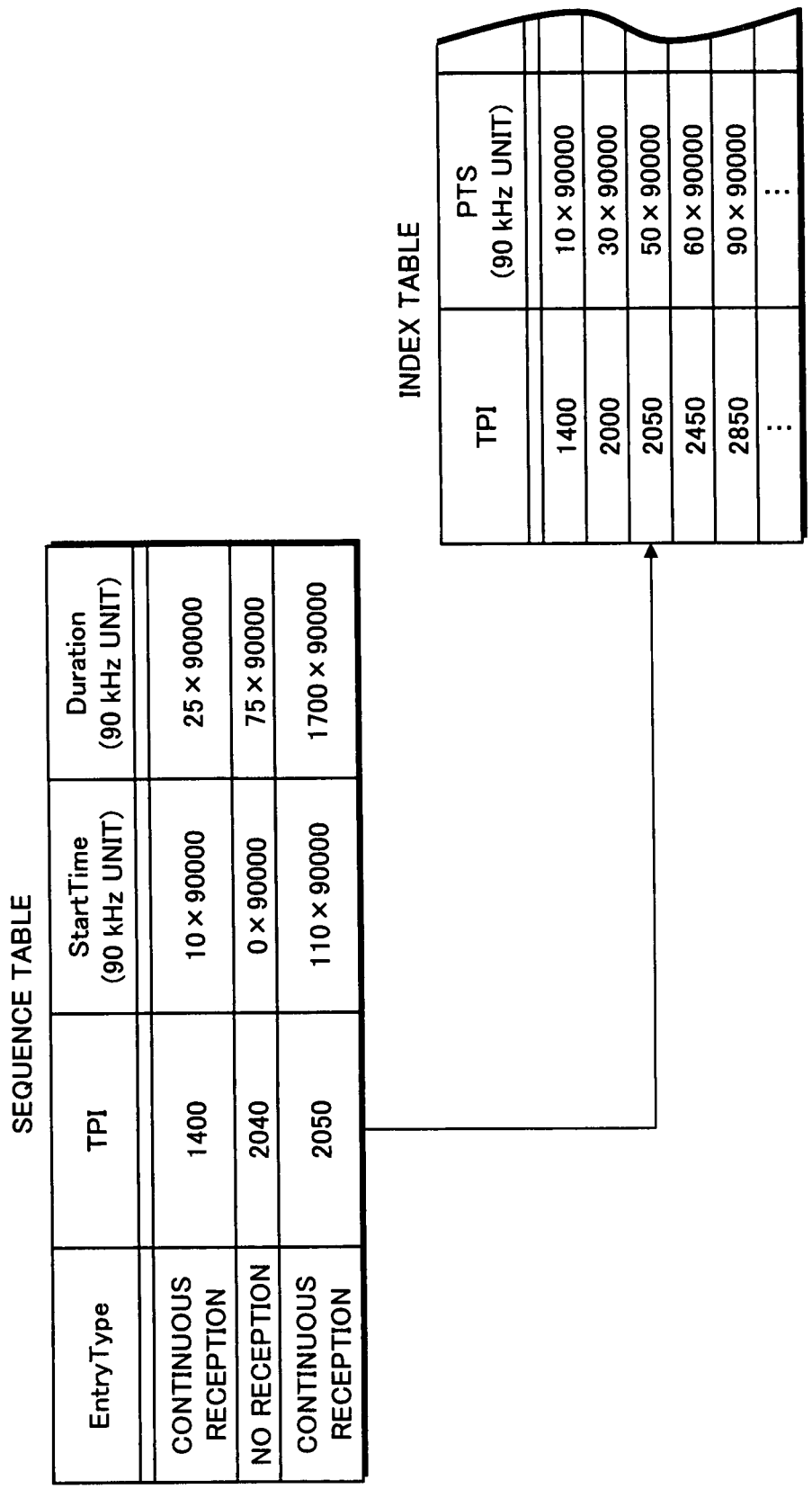
FIG. 22 shows correspondence relationships between a sequence table, an index table, and unreceivable section information.

The following describes operations when a user specifies a seek time and plays back the recorded stream data, in a case in which a signal reception condition worsens at the PCR reset point shown in FIG. 3 and the PCR reset information cannot be acquired, with reference to FIGS. 21 and 22.

FIG. 21 shows STC movements when airwave reception conditions are poor when a PCR is reset. When the PCR reset point cannot be received, the STC continues counting up until the PCR information is acquired. FIG. 22 shows an index table generated by the stream reception/analysis unit 101, and a sequence table including section information of unreceivable sections generated by the section information generation unit 103. The index table depicted here only includes the TPI and the PTS.

First, the stream data recording apparatus determines, with use of the sequence table, which section includes the user-specified seek time. For example, if 100 seconds is specified as the seek time, since the data 100 seconds after the head of the sequence table corresponds to a time when the unreceivable section ends and the next continuous reception section starts, it is understood that the data immediately follows the end of the unreceivable section.

Lastly, the TPI from which decoding processing is to start is determined with use of the index table. In the sequence table, the TPI corresponding to the seek time is 2050. Further reference to the index table indicates that the playback can begin from the TS packet whose TPI is 2050, since the data of the TS packet whose TPI is 2050 includes an IDR picture. If the TPI corresponding to the seek time is 2100, the stream data recording device starts demultiplexing and decoding audio and video data from the TS packet whose TPI is 2050, and begins output processing to a speaker and a display from the data whose TPI corresponding to the playback start time is 2100.

According to this structure, the playback starting position judgment unit 113 can judge whether the user-specified seek time is included in an unreceivable section and associate the seek time and the stream data with use of the unreceivable section information.

The structure of embodiment 1 above enables, in a case of a missing portion occurring in the data to be recorded due to the worsening of reception conditions, generation of time information of sections including missing portions in the stream data to be recorded and position information in the stream data, as well as storage of the time information and position information as section information of unreceivable sections. Since this structure enables correlating the stream data that is actually recorded and a continuous time from the recording start time, when the user designates a seek time and plays back the recorded stream data, this structure achieves the effect of preventing malfunctions such as starting playback from a different position from the one intended by the user, and outputting error data that contains noise.

Embodiment 2

The following describes a stream data recording/playback apparatus 204 of embodiment 2 that, in a case of simultaneously recording and playing back stream data after reception thereof, uses information obtained in the stream data playback process for stream data missing portion detection processing.

Figure 23:
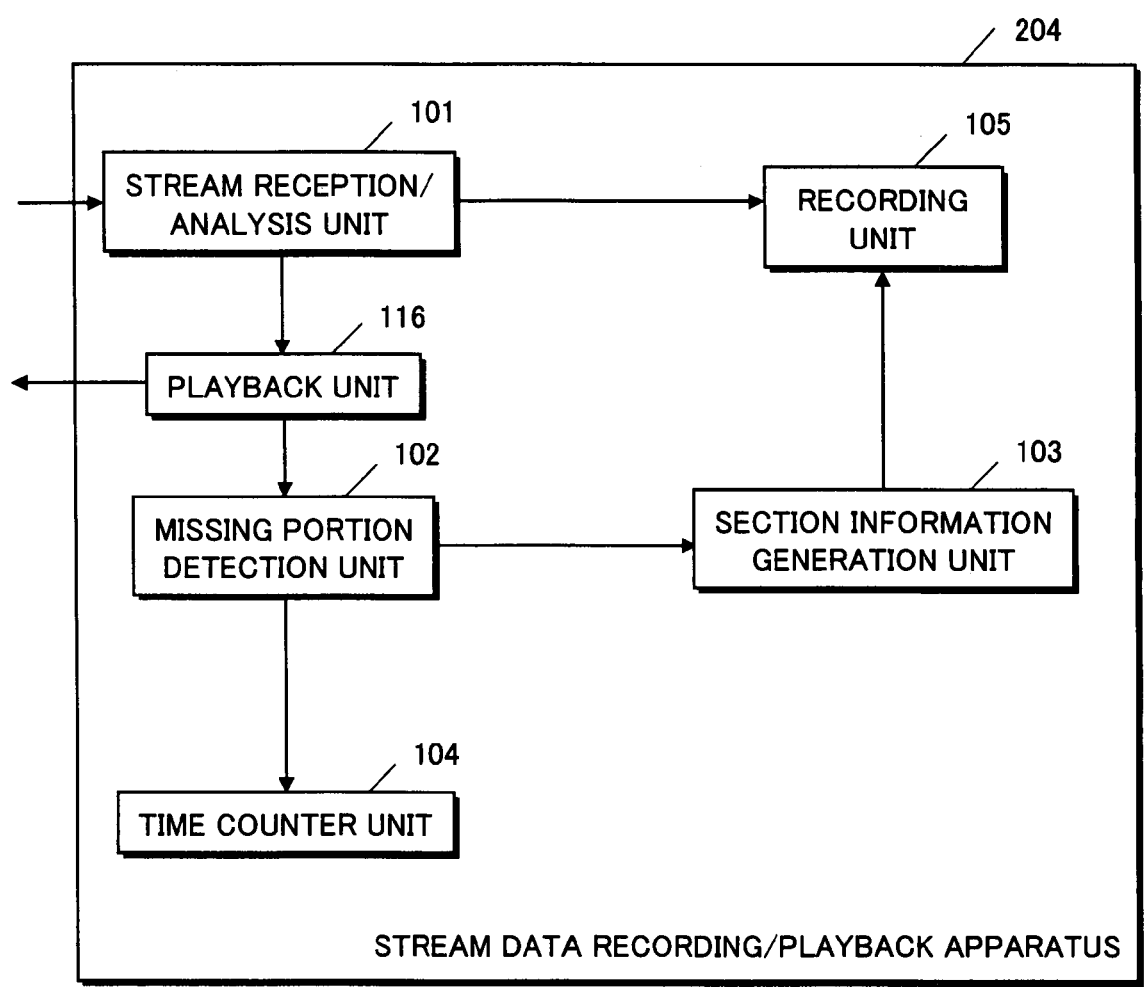
FIG. 23 is a block diagram showing a functional structure of a stream data recording/playback apparatus pertaining to embodiment 2.

FIG. 23 is a block diagram showing a functional structure of a stream data recording/playback apparatus pertaining to embodiment 2.

In FIG. 23, structural elements that are similar to ones used in FIGS. 2, 14, and 15 have been given the same reference symbols, and description thereof is omitted.

The playback unit 116 in FIG. 23 is specifically, a decoder that demultiplexes the stream data for recording and playback acquired from the stream reception/analysis unit 101 into audio data and video data, and decodes the audio and video data. The playback unit 116 notifies the missing portion detection unit 102 of the occurrence of errors such as decoding errors and buffer underflow errors in demultiplexing and decoding processing, and recovery from errors.

Upon acquiring the error notification from the playback unit 116, the missing portion detection unit 102 acquires time information from the time counter unit 104 as the missing portion detection start point and acquires the stream data position at the time of error occurrence from the playback unit 116. Upon acquiring the error recovery notification similarly from the playback unit 116, the missing portion detection unit 102 acquires time information as the missing portion detection end point from the time counter unit 104, and acquires the size of the stream data that was discarded by the playback unit 116 due to the occurrence of an error. Note that PTS information or DTS information included in the PES header, or PCR information included in the TS header can also be used as time information. Also, as information specifying the position in the stream data, TPIs of error occurrence times and recovery times may be acquired from the stream reception/analysis unit 101, or a stream data size from the recording start position may be acquired. Also, the information may be acquired from the recording unit 105.

This structure simplifies the structure of the missing portion detection unit structure and facilitates implementation, since the continuity disruption is detected by receiving the error notification from the playback unit 116.

Furthermore, according to this structure, unreceivable sections are detected according to decoding processing capacity of the playback unit 116 since the missing portion detection unit 102 detects unreceivable sections by receiving error notifications from the playback unit 116. Therefore, a constant quality level can be maintained when the user designates a seek time and plays back temporarily recorded stream data. For example, this structure can prevent instances of stream data corresponding to the designated start time that was considered playable due to being included in a continuous reception section actually not being playable during playback processing due to errors resulting from a low level of decoding processing ability.

Similarly to the stream data recording apparatus 201 of embodiment 1, the above stream data recording/playback apparatus 204 records streams and unreceivable section information to a recording medium, thereby enabling playback of recorded stream data from the designated seek time with use of the unreceivable section information.

In embodiment 2, section information pertaining to unreceivable sections is generated based on playback error notifications such as notifications of decoding errors and buffer underflow error notifications that occurred during the playback process, thereby enabling the generation of section information pertaining to the playback processing ability. Therefore, this structure can, for example, prevent instances of stream data corresponding to the designated start time that was considered playable due to being included in a continuous reception section actually not being playable during playback processing due to errors resulting from a low level of decoding processing ability.

Embodiment 3

If playback is performed in a case of a continuous reception section of short duration being sandwiched between unreceivable sections, the video will have frequent interruptions and it is possible for the user to feel discomfort. The following describes a stream data recording apparatus 205 of embodiment 3 that, in a case of a continuous reception section of short duration being sandwiched between unreceivable sections, updates section information to reduce discomfort during playback.

Figure 24:
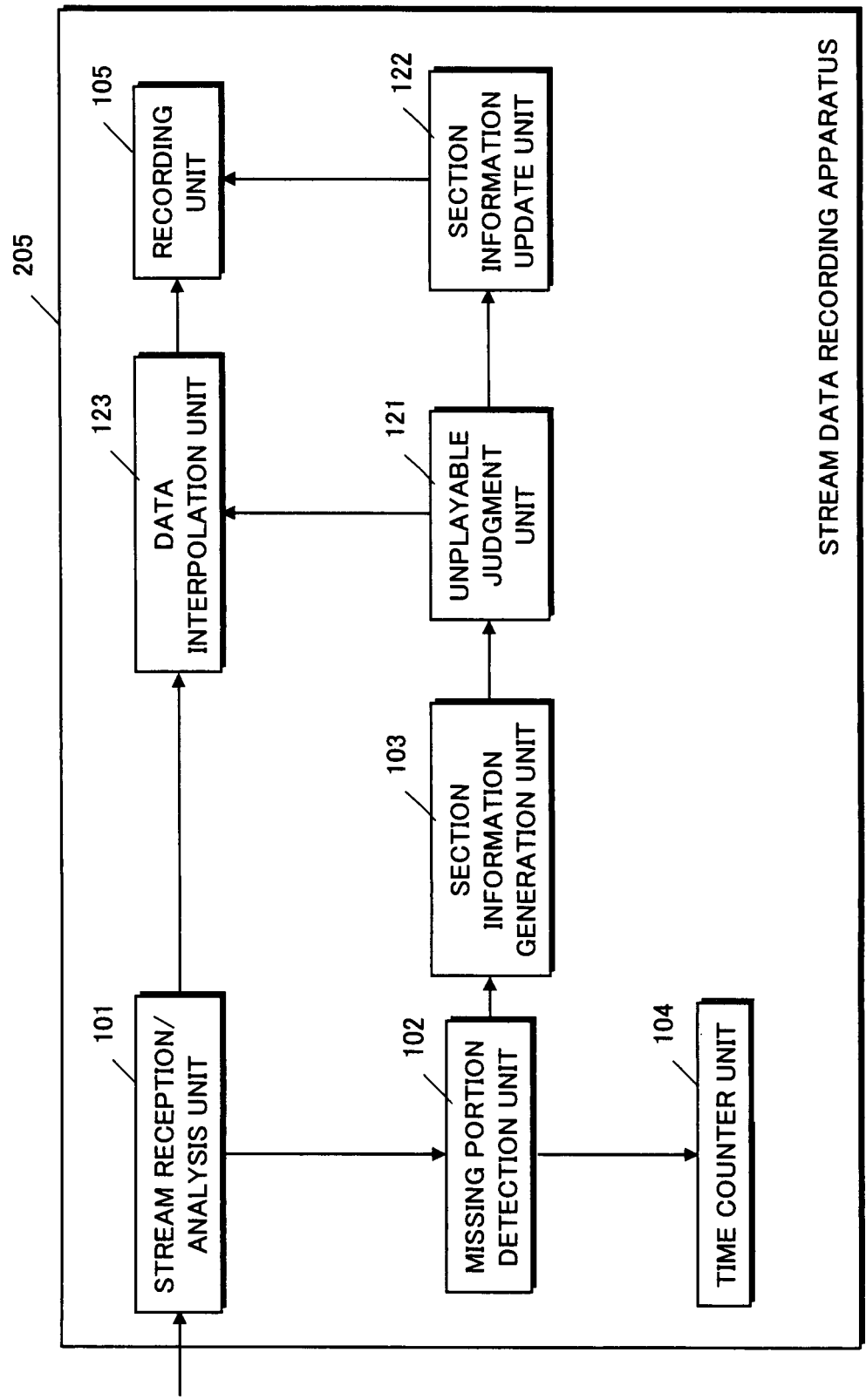
FIG. 24 is a block diagram showing a functional structure of a stream data recording apparatus pertaining to embodiment 3.

FIG. 24 is a block diagram showing a functional structure of a stream data recording apparatus pertaining to embodiment 3.

In FIG. 24, constituent elements that are similar to ones in FIGS. 2, 14, and 23 have been given the same reference symbols, and description thereof is omitted.

An unplayable judgment unit 121 acquires a sequence table including section information of unreceivable sections from the section information generation unit 103, and judges whether to actually play back a continuous reception section, in accordance with durations of continuous reception sections and unreceivable sections.

A section information update unit 122 receives a notification from the unplayable judgment unit 121, and updates the sequence table by integrating section information that is recorded therein.

Figure 25:
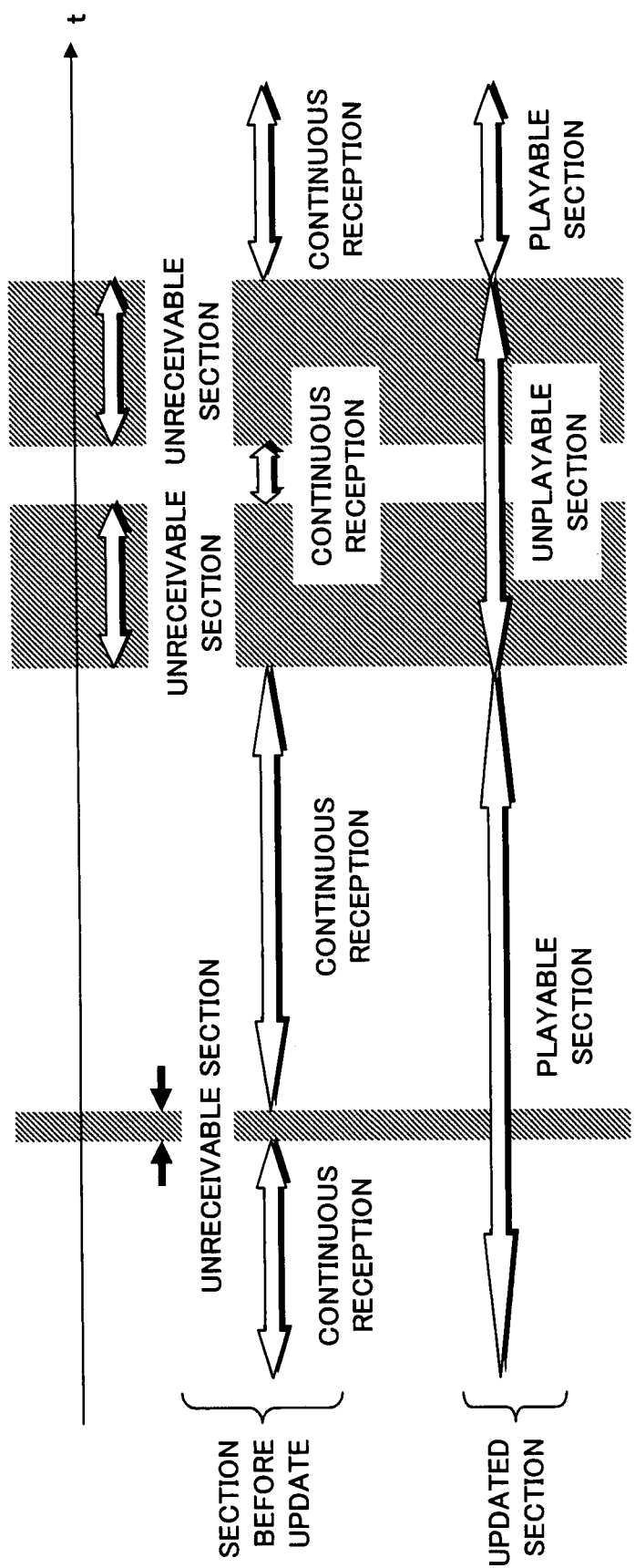
FIG. 25 is a pattern diagram showing updating of sections in a sequence table of embodiment 3.

Specifically, as shown in FIG. 25, if a continuous reception section of short duration sandwiched between unreceivable sections is judged to be playable, the three types of section information corresponding to the short-duration continuous reception section and the unreceivable sections immediately before and after the short-duration continuous reception section are integrated into section information indicating one continuous reception section in the sequence table. On the other hand, if the continuous reception section of short duration sandwiched between the unreceivable sections is judged to be unplayable, the three types of section information corresponding to the short-duration continuous reception section and the unreceivable sections immediately before and after the short-duration continuous reception section are integrated into section information indicating one unreceivable section in the sequence table.

Below, a section in which the section information is integrated by an update performed by the section information update unit 122 to be considered unplayable is called an "unplayable section", and a section in which the section information is integrated by an update performed by the section information update unit 122 to be considered playable is called a "playable section".

The data interpolation unit 123, in accordance with a result from the unplayable judgment unit 121, inserts dummy TS packets as interpolated data into the stream data to be recorded in correspondence with unreceivable sections that were integrated into playable sections.

The recording unit 105 records the stream data output from the data interpolation unit 123 and the sequence table updated by the section information update unit 122 to the recording medium.

According to this structure, judging whether the stream data is actually playable in accordance with the durations of continuous reception sections and unreceivable sections eliminates playback of short-duration continuous reception sections. Also, considering short-duration unreceivable sections as playable enables prolonging the continuous reception sections. Therefore choppiness and the resulting user discomfort when the recorded data is played back can be prevented.

The following describes judgment processing by the unplayable judgment unit. The unplayable judgment unit 121 calculates the duration of the continuous reception sections and the unreceivable sections with use of the section information of the unreceivable sections acquired from the section information generation unit 103. If the continuous reception sections are short, and the duration is less than or equal to a predetermined threshold, the unplayable judgment unit 121 judges not to play back the sections. Then the unplayable judgment unit 121 notifies the judgment result to the section information update unit 122 along with the unreceivable section information. If the unreceivable sections are short, and the duration is less than or equal to a predetermined threshold, the unplayable judgment unit 121 judges that the sections are playable. Here, a playback quality level may be judged in accordance with the time of unreceivable sections, the total duration, ratio or frequency of occurrence of unplayable sections included in a predetermined time period. In this case, playback in accordance with the decoding processing capacity at the time of playback is possible.

For example, in a case of judging the quality level according to three levels "high", "medium" and "low", if the decoding processing ability is low, a judgment is made that sections having levels "medium" and above are playable, while if the decoding processing ability is high, a judgment is made that in addition to the levels "medium" and "high", the level "low" sections are playable and playback processing can be performed.

Note that in the playability judgment, besides using time information of continuous reception sections and unreceivable sections, using a number of TS packets having recording-target PIDs included in continuous reception sections and the unreceivable sections is also possible. The number of TS packets having recording-target PIDs included in continuous reception sections and unreceivable sections can be calculated with use of a continuity counter value in the TS packet header information.

The threshold used in the judgment can either be stored in advance as a fixed value, or set by the user. Also, a threshold map for each program category may be stored. In this case, making the playable section threshold stricter for programs in the stream to be recorded that are more sound sensitive, such as music programs and talk shows, enables reducing user discomfort according to the characteristics of the program when the recorded stream is played back.

The following describes a section information update by the section information update unit 122. The section information update unit 122 integrates the sections that have been judged by the unplayable judgment unit 121 to be unplayable into the section information as unplayable sections. As shown in FIG. 25, the unplayable judgment unit 121 considers the sections that were judged to be playable despite being unreceivable sections to be playable sections, and the sections that were judged to be unplayable despite being continuous reception sections to be unplayable sections, and performs merge processing on the continuous reception sections and the unreceivable sections in the sequence table. Also, changing the playback time information of the stream to be recorded in accordance with the merge processing of the continuous reception sections and the unreceivable sections is effective in achieving a separate effect that a total playback time information of playable stream data can be known.

Figure 13:
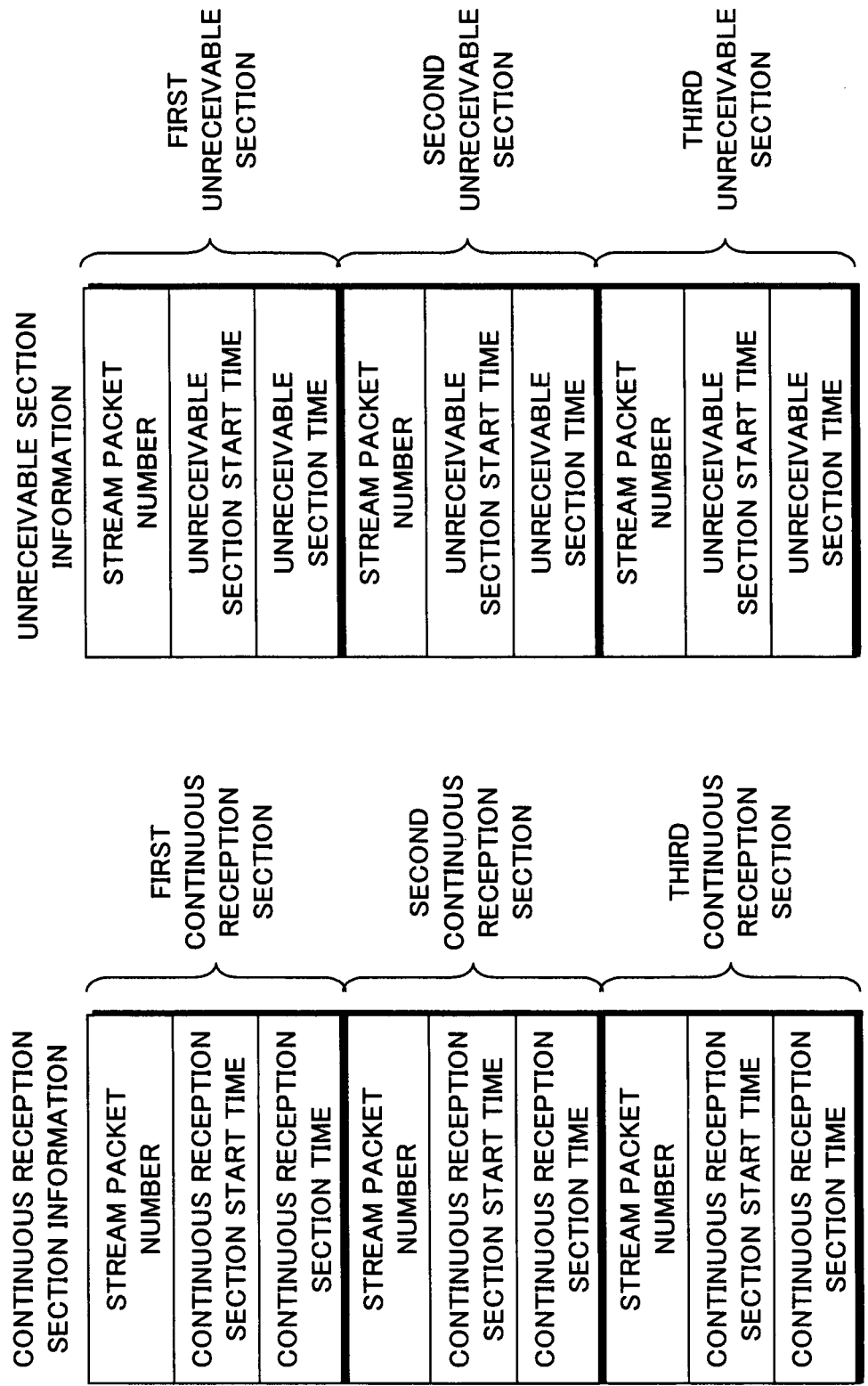
FIG. 13 shows a further example of section information.
Figure 26:
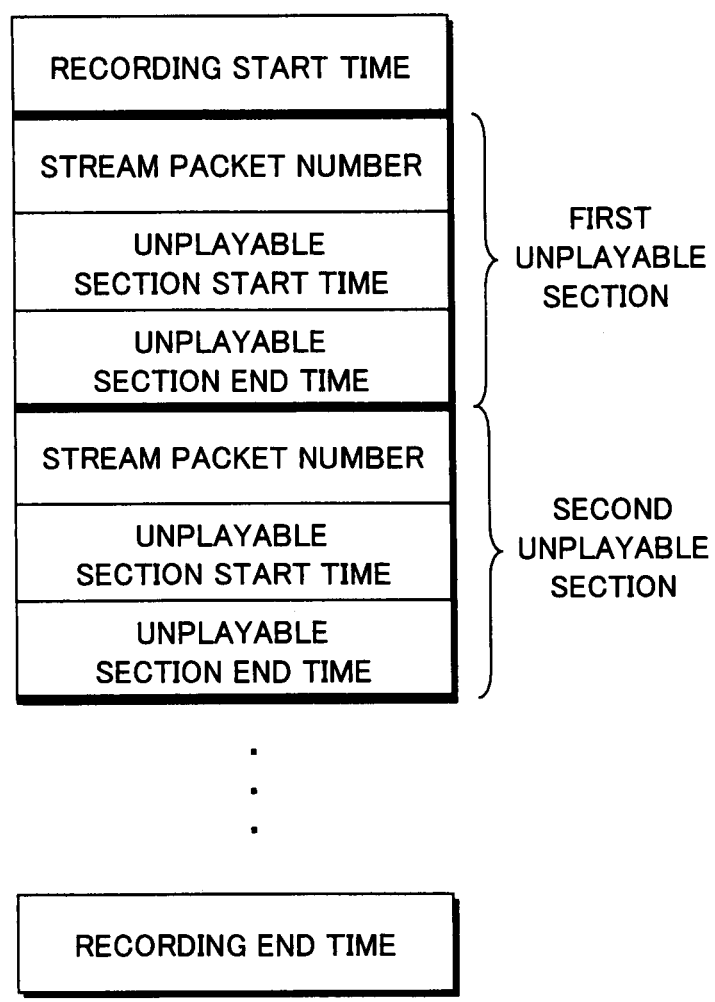
FIG. 26 shows a data structure of section information pertaining to embodiment 3.
Figure 27:
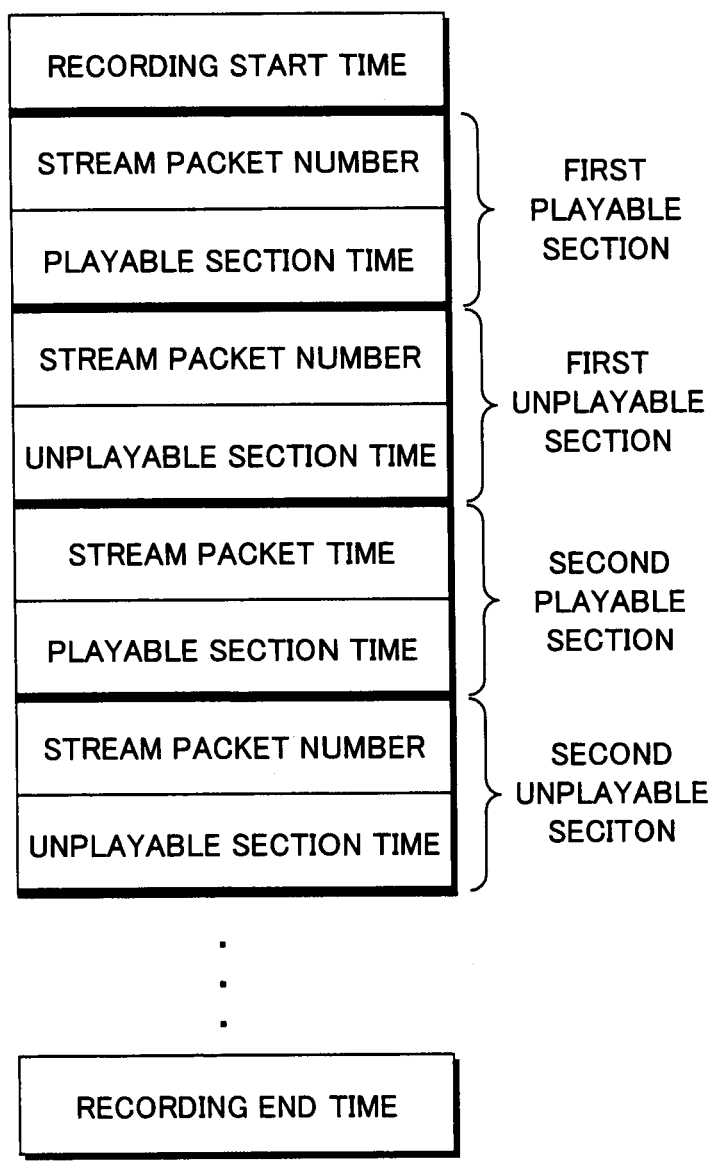
FIG. 27 shows another example of the section information pertaining to embodiment 3.
Figure 28:
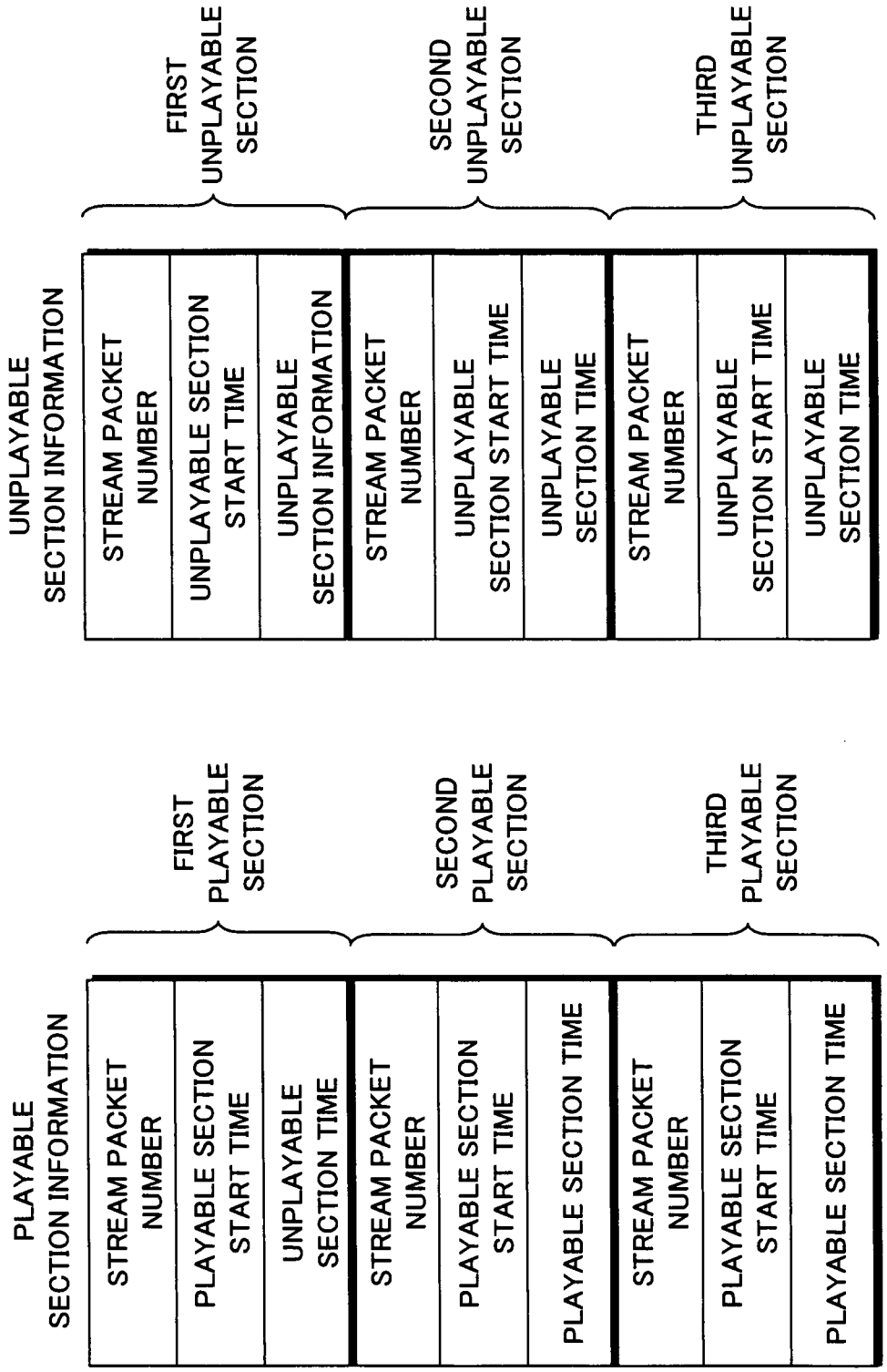
FIG. 28 shows a further example of the section information pertaining to embodiment 3.

Also, as shown in FIGS. 26, 27, and 28, the section information update unit 122 may generate section information of unplayable sections as section information indicating sections that include missing portions of stream data, for example with use of a similar data structure to the data structure shown in FIGS. 6, 10 and 13.

Figure 29:
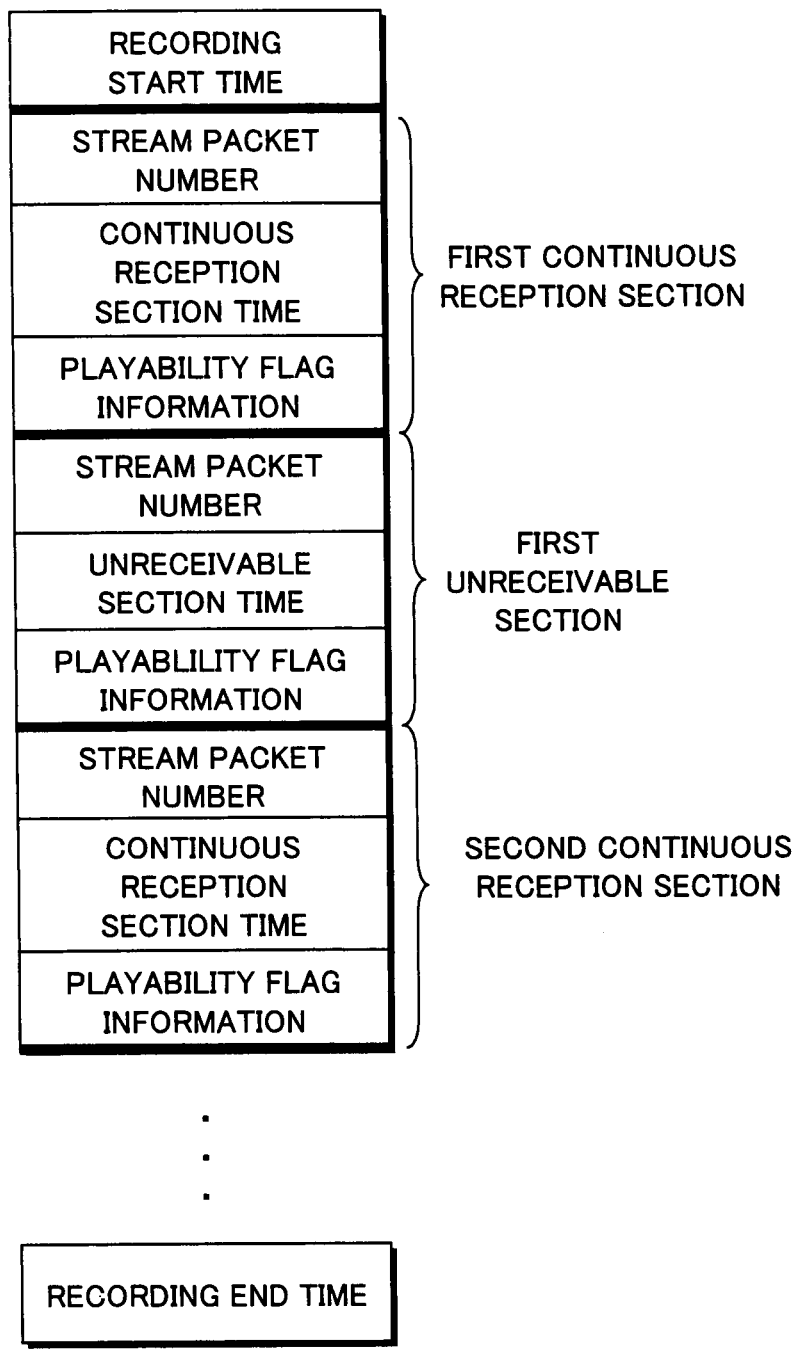
FIG. 29 shows a data structure of section information including a playability flag.

Note that the data structure of the playback section information is not limited to the data structures shown in FIGS. 26 to 28, and another data structure may be used, provided that information indicating the duration and positions in the stream data of the unplayable sections is included. For example, as shown in FIG. 29, the data structure may have time information indicating durations of sections and TPIs indicating positions of the sections in the stream, as well as playability flags.

Figure 30:
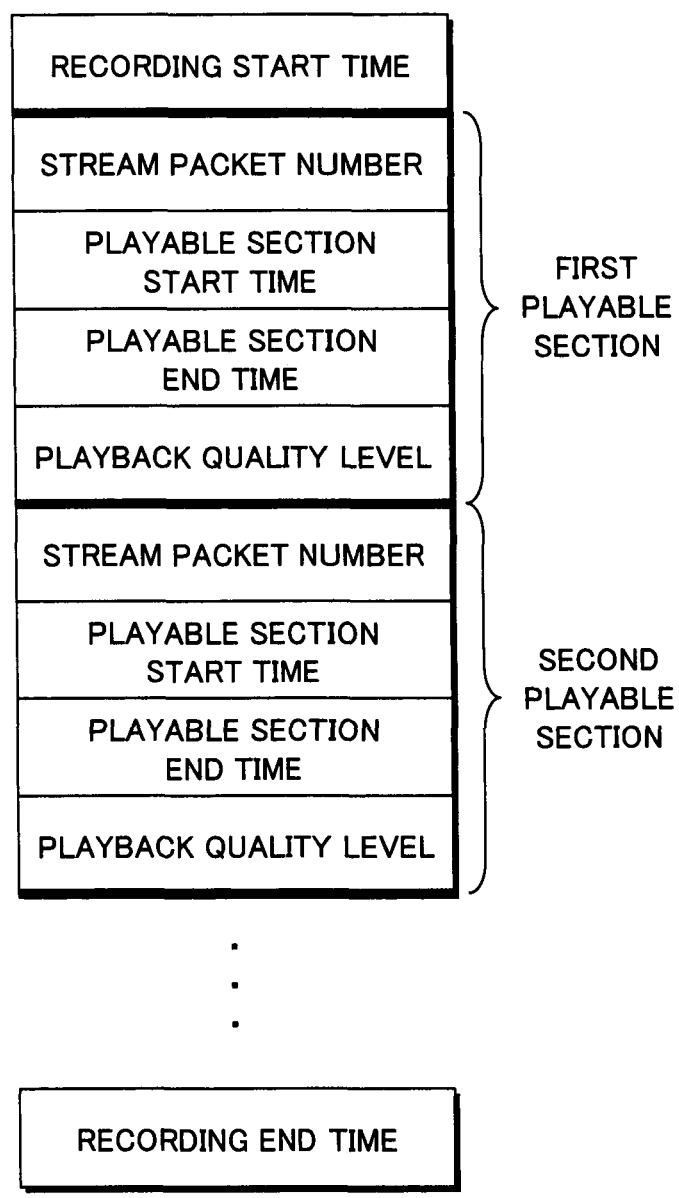
FIG. 30 shows a data structure of section information including a playback quality level.

Furthermore, if the playback quality level of the playable sections is judged by the unplayable judgment unit 121, the section information update unit 122 may generate section information that also includes the playback quality level information. For example the section information shown in FIG. 30 can be generated. The section information is not limited to the depicted format, provided that a correspondence is made between playable sections and the playback quality levels thereof.

Note that the sequence tables updated by the section information update unit 122 may be collectively recorded by the recording unit 105 to a recording medium when the stream data recording has ended, or a judgment result notification may be received from the unplayable judgment unit 121, and the section information update unit 105 may record the updated section information to the recording medium with every update of the section information.

The following describes interpolation processing of stream data to be recorded, which is carried out by the data interpolation unit 123. If the unreceivable sections are short, and are judged to be playable by the unplayable judgment unit 121, the data interpolation unit 123 inserts dummy TS packets corresponding in duration to the unreceivable sections into the recording-target stream data output from the stream reception/analysis unit 101. For example, packets whose payload information is zero may be used for the dummy TS packets. Aside from TS packets, dummy PES packets, ES (Elementary Stream) data, or the like can be used as the interpolated data. Note that inclusion of the data interpolation unit 123 is not necessary. In the case of not including the data interpolation unit 123, it is sufficient to, when playing back the recorded stream data, similarly insert the dummy data, perform mute control when outputting to a speaker or a display, or disable the DSP (Digital Signal Processor) etc.

Note that although in the present embodiment, a structure was described in which unplayable judgment processing and section information update processing are performed while recording the stream data, in the present invention, a sequence table may be acquired from the recording unit 105 and unplayable judgment processing and section information update processing may be performed after recording of the stream data has ended. Also, instead of the section information generation unit 103 generating section information of unreceivable sections, the playability judgment may be made and unplayable section information generated directly from the time information of the missing portion detection start point and the missing portion detection end point.

According to the structure of embodiment 3 above, judging whether to actually perform playback in accordance with the durations of continuous reception sections and unreceivable sections enables control so that sections having short playback times are not played back. Therefore, this structure has an effect of preventing frequent interruptions in audio and video output that results in the user feeling discomfort or discord during playback.

Embodiment 4

A stream data playback apparatus 206 that plays back stream data after updating the section information if a short-duration continuous reception section is sandwiched between unreceivable sections so as to reduce discord during playback is described as embodiment 4.

Figure 31:
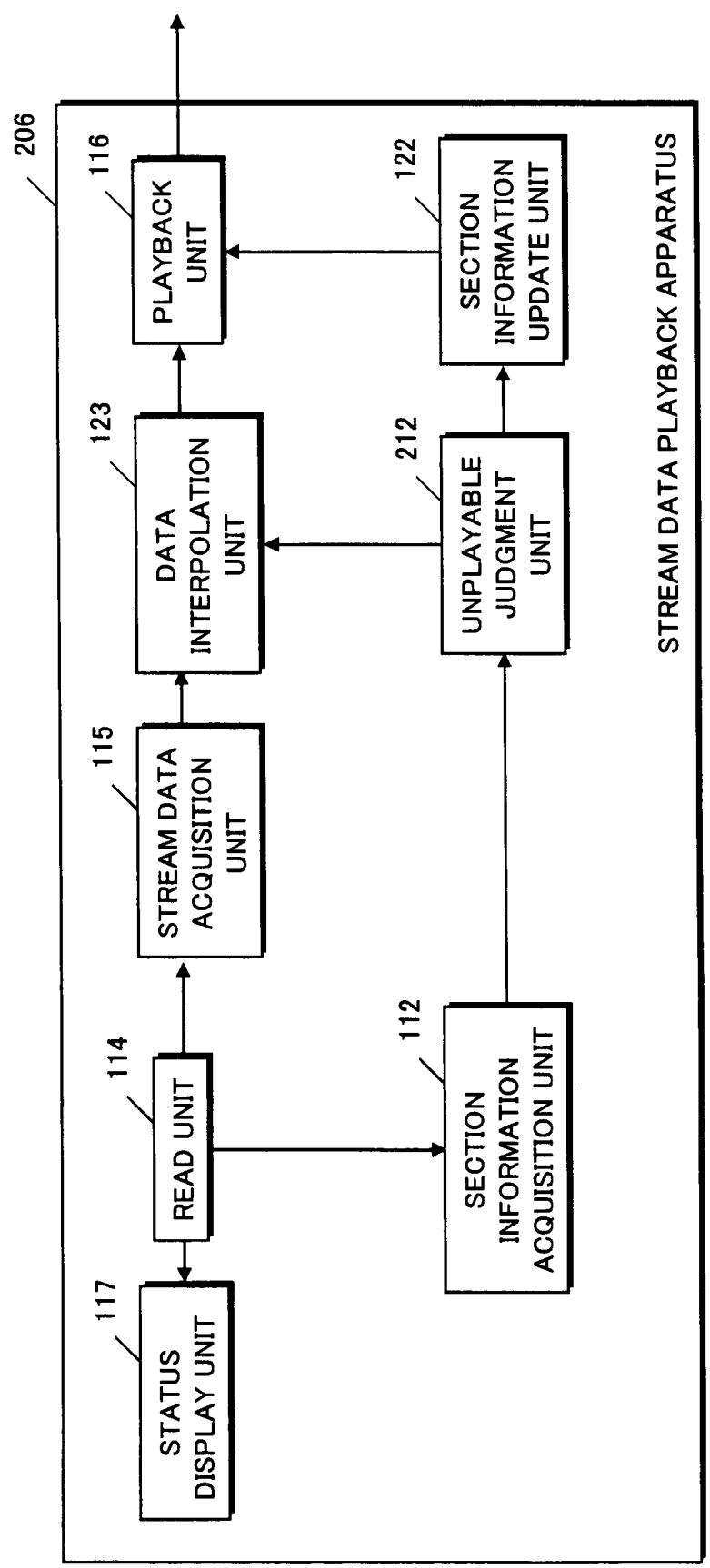
FIG. 31 is a block diagram showing a functional structure of a stream data playback apparatus pertaining to embodiment 4.

FIG. 31 is a block diagram showing a functional structure of the stream data playback apparatus 206 pertaining to embodiment 4.

The stream data playback apparatus 206 is an apparatus that plays back stream data recorded by the stream data recording apparatus 201 of embodiment 1 with use of the recording medium on which was recorded the stream data and the sequence table including section information of unreceivable sections. In FIG. 31, structural elements that are similar to ones used in FIGS. 15, 23, and 24 have been given the same reference symbols, and description thereof is omitted.

The unplayable judgment unit 121 acquires section information of unreceivable sections from the section information acquisition unit 112, and judges whether to actually play back an unreceivable section, in accordance with durations of continuous reception sections and unreceivable sections, the total duration, ratio or frequency of occurrence of unplayable sections included in a predetermined time period, TS packet number or data size of packets of PIDs to be recorded in a predetermined time period, etc. In this case, judging the playback quality level is also possible.

Figure 32:
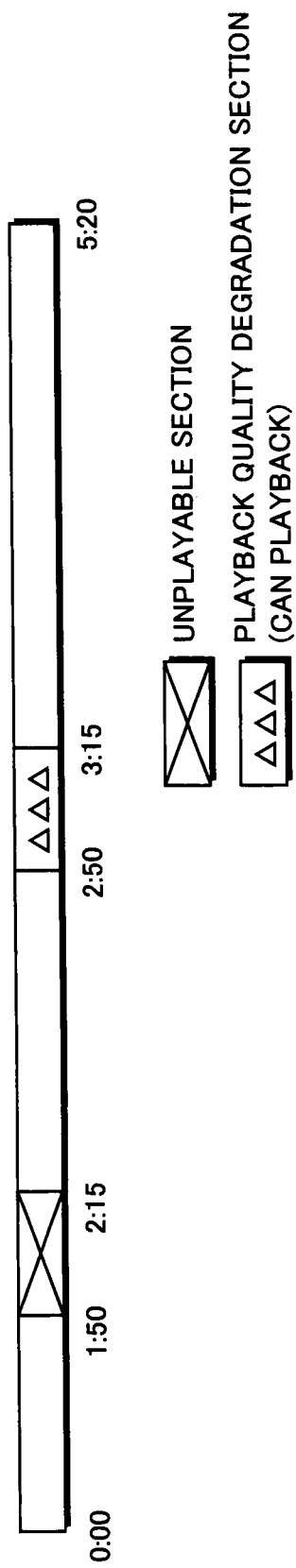
FIG. 32 is an example of a screen display that presents a status of recorded stream data to the user.

In FIG. 31, the status display unit 117 generates and outputs to the monitor a screen that presents a recorded stream data status to the user based on a sequence table updated by the section information update unit 122. Specifically, display processing by the status display unit 117, as shown in FIG. 32, displays playable sections, unplayable sections, and sections that, though playable, have deteriorating image quality, on a bar object that shows all of the stream data in accordance with the comparative time lengths of each.

According to this structure, judging whether sections will actually be played back in accordance with time information of continuous reception sections and unreceivable sections eliminates playback of short-duration continuous reception sections. Also, targeting short-duration unreceivable sections for playback enables extending continuous reception sections. This prevents the frequent occurrence of choppiness of audio and video output and user discomfort at the time of stream data playback.

Furthermore, judging playability with use of the unplayable judgment unit 121 in accordance with the decoding processing capacity of the playback unit 116 enables stream data playback that makes sufficient use of decoding processing capacity.

The unplayable judgment unit 121 may perform the playability judgment during playback. In this case, the section information update unit 122 need not be provided since the unplayable section information does not necessarily need to be generated. Also, before starting the stream data playback, a playability judgment may be performed in advance, unplayable section information may be generated by the section information update unit 122, and changed to match, for example, the playback time information. This method is effective, and enables the total playback time information of the stream data that is actually playable to be understood.

When the duration of an unreceivable section is short, and is judged to be playable by the unplayable judgment unit, the data interpolation unit 123 inserts a dummy TS packet corresponding in duration with the section into the stream data output from the stream data acquisition unit 115.

For example, packets whose payload information is zero may be used for the dummy TS packets. Aside from TS packets, dummy PES packets, ES (Elementary Stream) data, or the like can be used as the interpolated data. Note that inclusion of the data interpolation unit 123 is not necessary. In this case, the playback unit 116 may, for example, similarly to a case of a delay that occurs while receiving and playing back a digital broadcast signal, perform no processing during such time, and begin processing upon synchronizing to the STC of the TS packet after the unreceivable section; acquire unplayable section information from the section information update unit 122 and perform mute control on a speaker that is not depicted during the unplayable sections; continuously output the same image to a display that is not depicted; output dummy audio data to the speaker that is not depicted; or disable a DSP (Digital Signal Processor).

As well as having similar effects to the structure of embodiment 3, the above structure of embodiment 4 furthermore has the effect of enabling stream data playback that makes sufficient use of decoding processing capacity by judging whether to actually play back sections in accordance with decoding processing ability during playback.

Embodiment 5

Figure 33:
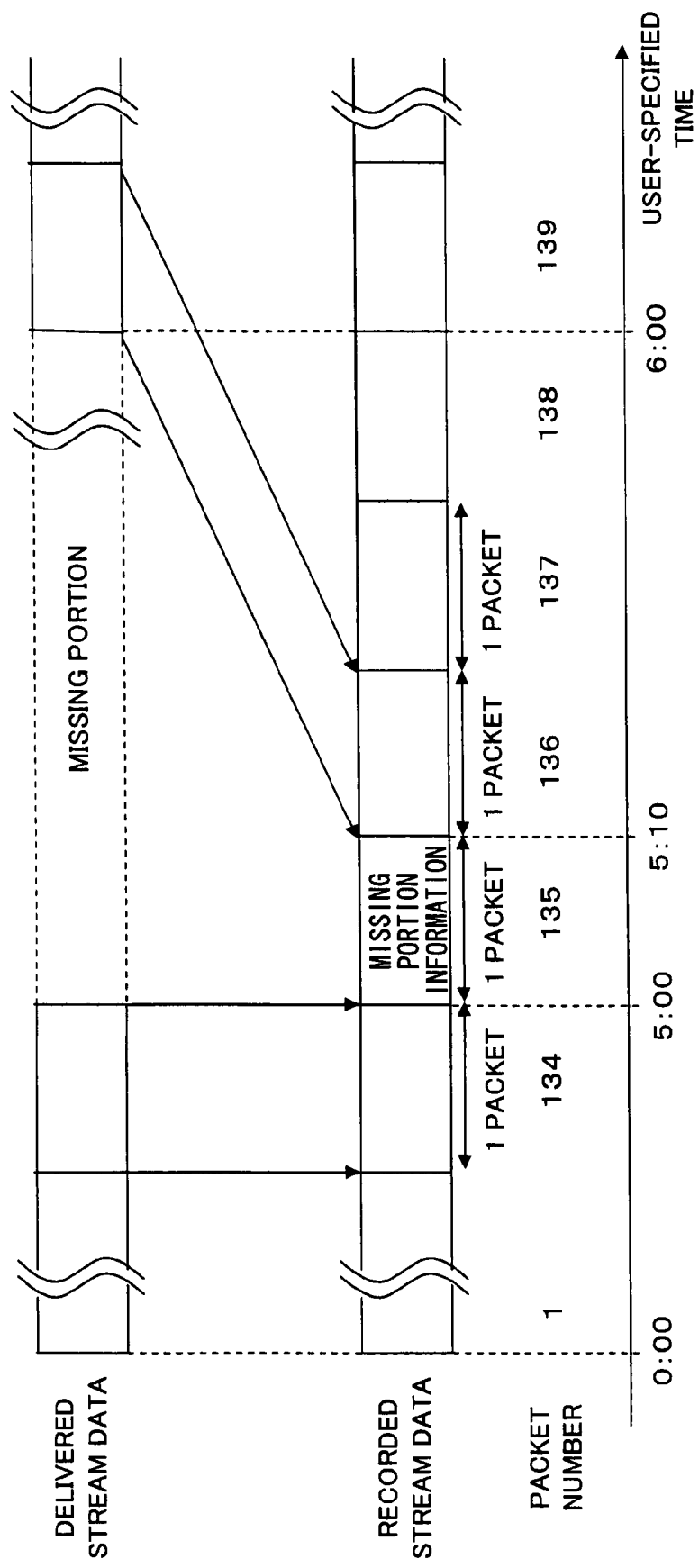
FIG. 33 shows stream data into which missing portion information has been inserted.

A stream data editing apparatus 220 that edits section information of unreceivable sections from stream data recorded in a state of having missing portion information embedded therein as shown in FIG. 33 is described as embodiment 5. Here, the missing portion information refers to dummy packets that have been inserted into places in the stream data where there are missing portions, and the dummy packets show, for example, the duration of a missing portion.

Figure 34:
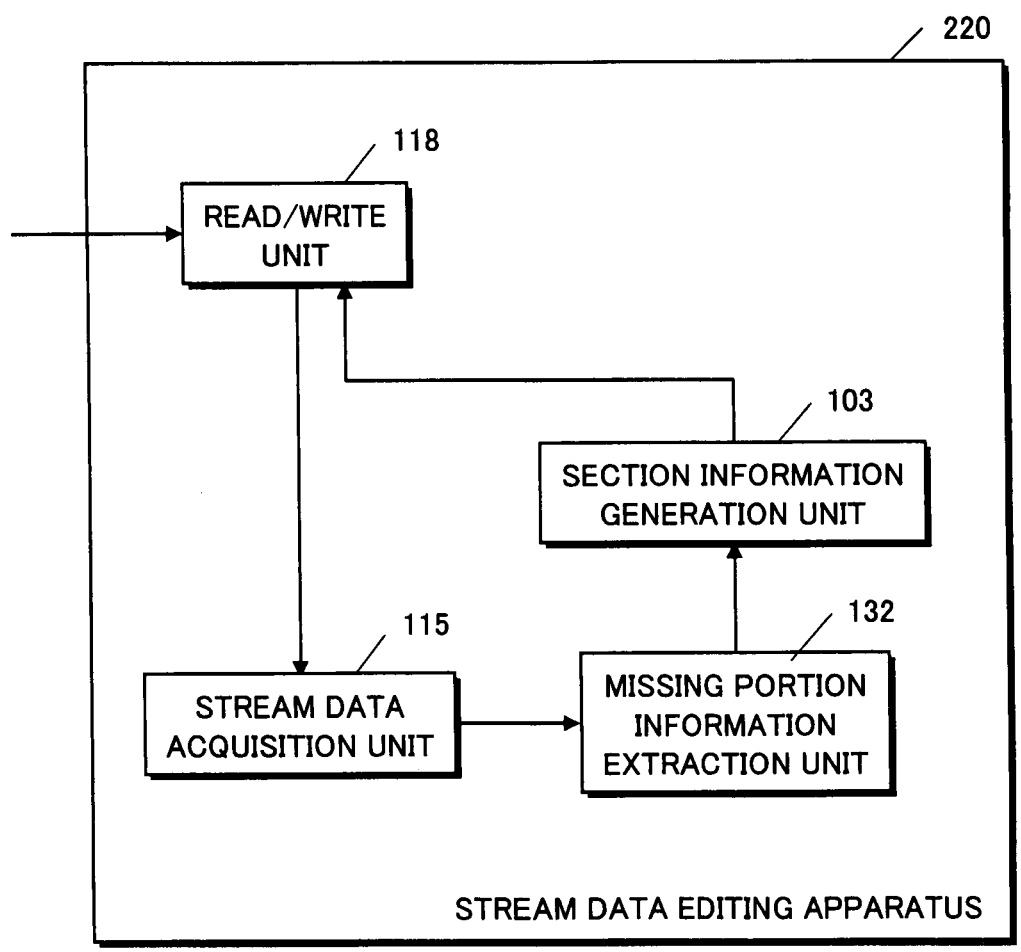
FIG. 34 is a block diagram showing a functional structure of a stream data editing apparatus pertaining to embodiment 5.

FIG. 34 is a block diagram showing a functional structure of the stream data editing apparatus 206 pertaining to embodiment 5. In FIG. 34, constituent elements that are similar to ones in FIGS. 15, 23, and 24 have been given the same reference symbols, and description thereof is omitted.

A read/write unit 118 reads the recorded stream from the recording medium, and writes the section information of the unreceivable sections generated by the section information generation unit 103 to the recording medium.

The missing portion information extraction unit 132 acquires stream data to be played back from the stream data acquisition unit 115, and, as shown in FIG. 33, extracts missing portion information embedded as packets in the stream data, and outputs the missing portion information to the section information generation unit 103.

According to this structure, when the user specifies a seek time in stream data that does not hold unreceivable section information, generating unreceivable section information with use of the missing portion information embedded in the stream data prevents malfunctions such as starting playback from a different position from one intended by the user, and error data output that contains noise.

According, to the structure of embodiment 5, generating unreceivable section information with use of missing portion information embodied in the stream data enables obtaining an effect similar to the case in which the stream data is recorded by the stream data recording apparatus described in embodiment 1, with respect to the stream data that is received and recorded, without generating section information of unreceivable sections.

The effects produced by the above embodiments 1 to 5 enable improvement of both user-friendliness and playback quality.

Other Variations

Note that although described based on the above embodiments, the present invention is of course not limited to such embodiments. Variations such as the following are also included in the present invention.

(1) The present invention may be realized as methods for recording and playback of stream data disclosed by the processing procedure in the flow charts of the embodiments. Also, the present invention may be realized as a computer program including computer code for causing a computer to operate by the methods. Also, the present invention may be realized as digital signals representing the computer program.

The present invention may be realized as a computer-readable recording medium (for example, a flexible disk, a hard disk, CD-ROM, MO, DVD, DVD-ROM, DVD-RAM, BD (Blue-ray Disc), or a semiconductor memory) containing the above computer program or digital signals recorded thereon.

Also, the present invention may be realized as the computer program or the digital signals transmitted by an electronic communication circuit, a wireless or fixed-line communications circuit, a network such as the Internet, etc.

Also, the present invention may be carried out by another independent computer system by transferring the programs or the digital signals that have been recorded on the recording media, or by transferring the programs or the digital signals via the network, etc.

(2) The present invention may be realized as an LSI for controlling a stream data recording apparatus, a stream data playback apparatus, a stream data recording/playback apparatus, and a stream data editing apparatus of embodiments 1 to 5. Such an LSI can be realized by integrating function blocks of the stream reception/analysis unit 101, the missing portion detection unit 102, the section information generation unit 103, the section information acquisition unit 112, the playback starting position, judgment unit 113, the stream data acquisition unit 115, the playback unit 116, the status display unit 117, the unplayable judgment unit 121, the section information update unit 122, the data interpolation unit 123, and the missing portion information extraction unit 132 shown in FIGS. 2, 14, 15, 23, 24, 31 and 34. Such function blocks may be realized as individual chips, or some or all of the function blocks may be constituted as a single chip.

Although referred to here as LSI, the integrated circuit may also be referred to as an IC, an LSI, a super LSI, or an ultra LSI, depending on the degree of integration.

Also, the method of integrating a circuit is not limited to LSI, and may be a dedicated circuit or a general-purpose processor. After LSI manufacture, the use of a (FPGA) field programmable gate array or a silicon flexible processor in which the connection and settings of circuit cells in the LSI can be restructured is possible.

Furthermore, if integration technology is developed that replaces LSIs due to progressive or derivative semiconductor technology, integration of functional blocks using this technology is naturally possible. For example, the application of biotechnology is a possibility.

(3) Although embodiments 1 to 5 of the present invention mainly discuss missing portion detection processing and section information generation processing in an unreceivable section with respect to a digital broadcast signal, needless to say, a similar effect can be obtained for a stream signal received via a network.

(4) Generally speaking, a TS includes a plurality of types of PESs such as audio PESs and video PESs. From among the plurality of PES, PTS information indicating the earliest time may be used as time information of the unreceivable section start point and the unreceivable section end point. Alternatively, the PTS information indicating the latest time may be used.

Also, time information of an unreceivable section start point and an unreceivable section end point may be set separately in the section information for each of type of PES. Note that instead of PTS information, use of DTS (Decoding Time Stamp) information included in a PES header or PCR (Program Clock Reference) information included in a TS header for specifying time information of an unreceivable section start point and an unreceivable section end point is also possible. Furthermore, if the audio data is compressed according to an MPEG (Moving Picture Experts Group) standard, a further effect of reducing a processing load when decoding the video data for playback can be obtained by using time information of IDR pictures as time information of the unreceivable section start point and the unreceivable section end point.

(5) Although in the embodiments 1 through 5, the section information including the time information specifying the length of the unreceivable section and the position information specifying a position of a missing portion occurring in the stream data is recorded to the same recording medium as the stream data, such information may be recorded to separate recording media, provided that the section information of the present invention and the stream data have been correlated with each other. For example, if the data size of the stream data is larger than the capacity of the recording medium, the present invention may be applied so that the stream data is divided and recorded onto a plurality of recording media, and the section information of unreceivable sections in portions of the stream data recorded on each recording medium is collectively recorded on one of the recording media, and a common ID is given to the section of the stream data and a corresponding piece of section information.

(6) The present invention may be any combination of the above embodiments and variations.

INDUSTRIAL APPLICABILITY

The present invention generates information specifying a duration of a section including a missing portion during reception and recording of stream data and a position of the section in the stream data, and is useful as trick playback technology that, after temporary storage, designates a seek time and performs playback processing. Effects of the present invention are particularly significant in a situation where a portion of stream data is likely to be missing, such as receiving a digital broadcast with use of a portable terminal. Furthermore, the present invention is applicable with respect to stream data received via a network. Also, rather than jumping to a designated seek time, the present invention can be applied to, for example, high-speed playback that performs playback by jumping from place to place or reverse playback.

The invention claimed is:

1. A stream data playback apparatus that plays back stream data that is recorded on a recording medium and that includes a plurality of packets, the stream data playback apparatus comprising:

a section information acquisition unit operable to acquire a sequence table and an index table,
wherein the sequence table indicates, for each of a plurality of sections divided from the stream data (i) a position of a head packet, (ii) a presentation time of the head packet, (iii) a duration of the section, and (iv) whether the section is an unreceivable section or a receivable section,
wherein the unreceivable section includes a section of the stream data starting from a point at which a packet missing at least a portion of data is detected when the stream data is recorded on the recording medium and ending at a point at which a packet missing no data is subsequently detected when the stream data is recorded on the recording medium,
wherein the receivable section includes a section of the stream data in which packets missing no data are continuously recorded before or after the unreceivable section, and
wherein the index table indicates, for each of a plurality of intra-pictures, a position and a presentation time of a head packet in the stream data;

a reception unit operable to receive, from a user, an arbitrary time on a playback time axis as a seek time;

a starting position judgment unit operable to:
specify a section to which the seek time belongs with reference to the sequence table;
when the sequence table indicates that the section to which the seek time belongs is the receivable section and the index table indicates that an intra-picture having the presentation time prior to the seek time exists in the section to which the seek time belongs, determine the position of the head packet of the intra-picture as a decoding start position and determine the seek time as a playback start time;
when the sequence table indicates that the section to which the seek time belongs is the receivable section and the index table indicates that the intra-picture having the presentation time prior to the seek time does not exist in the section to which the seek time belongs, determine the position of the head packet of the section to which the seek time belongs as the decoding start position and determine the presentation time of the head packet as the playback start time; and
when the sequence table indicates that the section to which the seek time belongs is the unreceivable section, determine the position of the head packet of a section immediately after the section to which the seek time belongs as the decoding start position and determine the presentation time of the head packet of the section immediately after the section to which the seek time belongs as the playback start time;

a read unit operable to read the stream data recorded on the recording medium from a playback starting position; and a playback unit operable to decode the read stream data and output, to a display, the decoded stream data from a picture having a presentation time which is the same as the playback start time.

2. The stream data playback apparatus of claim 1, further comprising a judgment unit configured to judge that a receivable section sandwiched between two unreceivable sections is unplayable when a duration of the sandwiched receivable section is less than or equal to a threshold determined such that interruptions in audio or video are not perceived by the user.

3. The stream data playback apparatus of claim 1,
wherein the stream data playback apparatus further comprises a judgment unit configured to judge whether or not the unreceivable section is playable with reference to the duration of the unreceivable section indicated by the sequence table, and
wherein, when the judgment unit judges that the unreceivable section is playable, the playback unit plays back the packet included in the unreceivable section.

4. The stream data playback apparatus of claim 3, further comprising:
an interpolation unit operable to, when the unreceivable section has been judged to be playable by the judgment unit, generate a dummy packet corresponding in duration to the duration of the unreceivable section indicated by the sequence table, and insert the dummy packet into the stream data at the position of the head packet of the unreceivable section indicated by the sequence table,
wherein the playback unit plays back the stream data into which the dummy packet has been inserted.

5. The stream data playback apparatus of claim 1, further comprising a judgment unit,
wherein the recording medium has further recorded thereon a during-playback quality level of the unreceivable section,
wherein the section information acquisition unit further acquires the quality level,
wherein the judgment unit judges whether or not the unreceivable section is playable with reference to the quality level, and
wherein, when the judgment unit judges that the unreceivable section is playable, the playback unit plays back the packet included in the unreceivable section.

6. The stream data playback apparatus of claim 5, further comprising:
a status display unit operable to display a display object indicating a total duration of the stream data recorded on the recording medium,
wherein the display object is segmented into a first area indicating a position, a duration, and a quality level of the unreceivable section, and a second area indicating a position and a duration of the receivable section, the first and second areas being distinct from each other.

7. The stream data playback apparatus of claim 1, further comprising:
a status display unit operable to display a display object indicating a total duration of the stream data recorded on the recording medium,
wherein the display object is segmented into a first area indicating a position of the unreceivable section and a duration thereof, and a second area indicating a position of the receivable section and a duration thereof, the first and second areas being distinct from each other.

8. The stream data playback apparatus of claim 1, further comprising:
a judgment unit configured to judge whether or not stream data of each section is playable with reference to the sequence table; and
a status display unit operable to display a display object indicating a total duration of the stream data recorded on the recording medium,
wherein the display object, in accordance with a judgment result by the judgment unit, is segmented into a first area indicating a position of an unplayable section and a duration thereof, and a second area indicating a position of a playable section and a duration thereof, the first and second areas being distinct from each other.

9. A stream data recording apparatus that records stream data including a plurality of packets to a recording medium, the stream data recording apparatus comprising:
an acquisition unit operable to acquire the stream data from reception data;
a stream data recording unit operable to record the acquired stream data to the recording medium in units of a packet;
a detection unit operable to detect, for each packet included in the acquired stream data, whether or not the packet is missing at least a portion of data;
a generation unit operable to generate information specifying a duration of an unreceivable section, information specifying a position of a head packet of the unreceivable section in the stream data, information specifying a duration of a receivable section, and information specifying a position of a head packet of the receivable section in the stream data,
wherein the unreceivable section includes a section of the stream data starting from a point at which a packet missing at least a portion of data is detected and ending at a point at which a packet missing no data is subsequently detected, and
wherein the receivable section includes a section of the stream data in which packets missing no data are continuously recorded before or after the unreceivable section;
a judgment unit operable to judge that a receivable section sandwiched between two unreceivable sections is unplayable when a duration of the sandwiched receivable section is less than or equal to a threshold determined such that interruptions in audio or video are not perceived by a user;
an unplayable information generation unit operable to generate information specifying the duration of the receivable section that has been judged to be unplayable and information specifying a position in the stream data of the receivable section that has been judged to be unplayable; and
a sequence information recording unit operable to record the information generated by the generation unit and the information generated by the unplayable information generation unit on the recording medium, in correspondence with the recorded stream data.

10. The stream data recording apparatus of claim 9,
wherein the generation unit further generates information specifying a position of a head packet in a continuous section in the stream data, and information indicating a reference time of a start point in the continuous section and a reference time of an end point in the continuous section, and wherein the continuous section is a section of the stream data which includes a series of continuous reference times.

11. The stream data recording apparatus of claim 9, wherein the detection unit detects a packet missing at least a portion of data when a reception level of received data has fallen to a predetermined level or lower, the predetermined level being determined such that the stream data is able to be restored normally.

12. The stream data recording apparatus of claim 9, wherein the detection unit detects a packet missing no data when a reception level of received data has reached a predetermined level or higher, the predetermined level being determined such that the stream data is able to be restored normally.

13. The stream data recording apparatus of claim 9, wherein the detection unit is further operable to analyze header information of a packet included in the stream data, and detect whether or not the packet, for which the header information is analyzed is missing at least a portion of data.

14. The stream data recording apparatus of claim 13, wherein the detection unit detects a packet missing at least a portion of data when one of (i) an irregular data size is detected by analyzing a size of information included in the header information, and (ii) an irregular value is detected by analyzing a value of the information included in the header information.

15. The stream data recording apparatus of claim 9, wherein the detection unit is further operable to analyze payload information of a packet included in the stream data and detect whether or not the packet, for which the payload information is analyzed, is missing at least a portion of data.

16. The stream data recording apparatus of claim 15, wherein the detection unit detects a packet missing at least a portion of data when one of (i) an irregular data size is detected by analyzing a size of information included in the payload information, and (ii) an irregular value is detected by analyzing a value of the information included in the payload information.

17. The stream data recording apparatus of claim 9, further comprising:
a time counter unit operable to count time,
wherein the generation unit is further operable to acquire time information from the time counter unit in correspondence with a detection of a packet missing at least a portion of data, and set the acquired time information as a start time of the unreceivable section.

18. The stream data recording apparatus of claim 9, wherein the generation unit sets, from among a plurality of time information pieces included in the stream data, a time information piece received normally prior to a detection of a packet missing at least a portion of data by the detection unit, as a start time of the unreceivable section.

19. The stream data recording apparatus of claim 9, further comprising:
a counter unit operable to count time,
wherein the generation unit is further operable to acquire time information from the time counter unit in correspondence with a detection of a packet missing no data after a detection of a packet missing at least a portion of data, and set the acquired time information as an end time of the unreceivable section.

20. The stream data recording apparatus of claim 9, wherein the generation unit sets, from among time information pieces included in the stream data, a time information piece received normally after the detection unit has detected a packet missing no data after a detection of a packet missing a least a portion of data, as an end time of the unreceivable section.

21. The stream data recording apparatus of claim 9, wherein the generation unit generates the information specifying the duration of the unreceivable section and the information specifying the position of the head packet in the unreceivable section in the stream data when a duration from a point at which a packet missing at least a portion of data is detected by the detection unit to a point at which a packet missing no data is subsequently detected by the detection unit is greater than or equal to the threshold, and does not generate the information specifying the duration of the unreceivable section and the information specifying the position of the head packet in the unreceivable section in the stream data when the duration is less than the threshold.

22. The stream data recording apparatus of claim 21,
wherein, when the duration is less than the threshold, the generation unit further generates quality information indicating a during-playback quality level of the stream data in accordance with the duration, and
wherein the recording unit further records the quality information to the recording medium.

23. The stream data recording apparatus of claim 21,
wherein the generation unit further generates quality information indicating a during-playback quality level of the stream data depending on a number of occurrences, in a predetermined time period, of the unreceivable section having the duration below the threshold, and
wherein the recording unit further records the quality information to the recording medium.

24. The stream data recording apparatus of claim 21,
wherein the generation unit further generates quality information indicating a during-playback quality level of the stream data depending on a cumulative time of unreceivable sections occurring in a predetermined time period among unreceivable sections having a duration below the threshold, and
wherein the recording unit further records the quality information to the recording medium.

25. The stream data recording apparatus of claim 9, wherein the generation unit generates the information specifying the duration of the unreceivable section and the information specifying the position of the head packet of the unreceivable section in the stream data when a size of data missed from a point at which a packet missing at least a portion of data is detected by the detection unit to a point at which a packet missing no data is subsequently detected by the detection unit is greater than or equal to the threshold, and does not generate the information specifying the position of the head packet of the unreceivable section in the stream data when the size of the missed data is less than the threshold.

26. The stream data recording apparatus of claim 25,
wherein the generation unit further generates quality information indicating a during-playback quality level of the stream data in accordance with the size of the missed data when the size of the missed data is less than the threshold, and
wherein the recording unit further records the quality information to the recording medium.

27. The stream data recording apparatus of claim 9, further comprising:
a judgment unit operable to judge that the unreceivable section is playable when the duration of the unreceivable section is less than the threshold; and a playable information generation unit operable to generate information indicating that the unreceivable section has been judged to be playable,
wherein the recording unit further records the information generated by the playable information generation unit to the recording medium.

28. The stream data recording apparatus of claim 27, further comprising:
an interpolation unit operable to, when the unreceivable section has been judged to be playable by the judgment unit, generate a dummy packet corresponding in duration to the duration of the unreceivable section, and insert the dummy packet into the stream data at the position of the head packet of the unreceivable section in the stream data,
wherein the recording unit records the stream data into which the dummy packet has been inserted.

29. The stream data recording apparatus of claim 9, further comprising:
a quality judgment unit operable to judge, when the stream data is recorded, a playback quality level of the unreceivable section,
wherein the recording unit further records the playback quality level of the unreceivable section in correspondence with the recorded stream data.

30. The stream data recording apparatus of claim 29, wherein the quality judgment unit judges a during-playback quality level of the unreceivable section in accordance with the duration of the unreceivable section.

31. The stream data recording apparatus of claim 29, wherein the quality judgment unit judges a during-playback quality level of one or more unreceivable sections included in a predetermined time period depending on a number of the unreceivable sections having durations below the threshold that exist in the predetermined time period.

32. The stream data recording apparatus of claim 29, wherein the quality judgment unit judges a during-playback quality level of one or more unreceivable sections included in a predetermined time period depending on a total duration of the unreceivable sections that exist in a predetermined time period.

33. The stream data recording apparatus of claim 29, wherein the quality judgment unit judges a during-playback quality level of the unreceivable section depending on a data size of a packet missing at least a portion of data in the unreceivable section.

34. The stream data recording apparatus of claim 29, wherein the quality judgment unit judges a during-playback quality level of the unreceivable section in accordance with a type of a packet missing at least a portion of data in the unreceivable section.

35. A stream data recording/playback apparatus that records stream data including a plurality of packets to a recording medium while playing back the stream data, the stream data recording/playback apparatus comprising:
an acquisition unit operable to acquire the stream data from reception data;
a playback unit operable to decode the stream data and play back the decoded stream data;
a detection unit operable to, when an error occurs in the decoding performed by the playback unit, detect a packet in which the error occurred as a packet missing at least a portion of data;
a stream data recording unit operable to record the acquired stream data to the recording medium in units of a packet;
a generation unit operable to generate information specifying a duration of an unreceivable section, information specifying a position of a head packet of the unreceivable section in the stream data, information specifying a duration of a receivable section, and information specifying a position of a head packet of the receivable section in the stream data,
wherein the unreceivable section includes a section of the stream data starting from a point at which a packet missing at least a portion of data is detected and ending at a point at which a packet missing no data is subsequently detected, and
wherein the receivable section includes a section of the stream data in which packets missing no data are continuously recorded before or after the unreceivable section;
a judgment unit operable to judge that a receivable section sandwiched between two unreceivable sections is unplayable when a duration of the sandwiched receivable section is less than or equal to a threshold determined such that interruptions in audio or video are not perceived by a user;
an unplayable information generation unit operable to generate information specifying the duration of the receivable section that has been judged to be unplayable and information specifying a position in the stream data of the receivable section that has been judged to be unplayable; and
a sequence information recording unit operable to record the information generated by the generation unit and the information generated by the unplayable information generation unit on the recording medium, in correspondence with the recorded stream data.

36. A stream data editing apparatus, comprising:
a read unit operable to read stream data including a plurality of packets from a recording medium,
wherein missing packet portion information indicating a duration of a missing section comprising packets is embedded in the stream data at a starting position in the missing section, and
wherein the missing section is a portion of the stream data from a point at which a packet missing at least a portion of data is detected to a point at which a packet missing no data is subsequently detected when the stream data is recorded;
an extraction unit operable to extract the missing portion information by analyzing the read stream data;
a generation unit operable to generate, in accordance with the missing portion information, information specifying a duration of an unreceivable section, information specifying a position of a head packet of the unreceivable section in the stream data, information specifying a duration of a receivable section, and information specifying a position of a head packet of the receivable section in the stream data,
wherein the unreceivable section is a section of the stream data which includes the missing section, and
wherein the receivable section is a section of the stream data in which packets missing no data are continuously recorded before or after the unreceivable section;
a judgment unit operable to judge that a receivable section sandwiched between two unreceivable sections is unplayable when a duration of the sandwiched receivable section is less than or equal to a threshold determined such that interruptions in audio or video are not perceived by a user; and
an unplayable information generation unit operable to generate information specifying the duration of the receivable section that has been judged to be unplayable and information specifying a position in the stream data of the receivable section that has been judged to be unplayable.

37. An integrated circuit that controls a stream data recording apparatus that records stream data including a plurality of packets to a recording medium, the integrated circuit comprising:
an acquisition unit operable to acquire the stream data from reception data;
a stream data recording unit operable to record the acquired stream data to the recording medium in units of a packet;
a detection unit operable to detect, for each packet included in the acquired stream data, whether or not the packet is missing at least a portion of data;
a generation unit operable to generate information specifying a duration of an unreceivable section, information specifying a position of a head packet of the unreceivable section in the stream data, information specifying a duration of a receivable section, and information specifying a position of a head packet of the receivable section in the stream data,
wherein the unreceivable section includes a section of the stream data starting from a point at which a packet missing at least a portion of data is detected and ending at a point at which a packet missing no data is subsequently detected, and
wherein the receivable section includes a section of the stream data in which packets missing no data are continuously recorded before or after the unreceivable section;
a judgment unit operable to judge that a receivable section sandwiched between two unreceivable sections is unplayable when a duration of the sandwiched receivable section is less than or equal to a threshold determined such that interruptions in audio or video are not perceived by a user;
an unplayable information generation unit operable to generate information specifying the duration of the receivable section that has been judged to be unplayable and information specifying a position in the stream data of the receivable section that has been judged to be unplayable; and
a sequence information recording unit operable to record the information generated by the generation unit and the information generated by the unplayable information generation unit on the recording medium, in correspondence with the recorded stream data.

38. A stream data playback method that plays back stream data that is recorded on a recording medium and that includes a plurality of packets, the stream data playback method comprising the steps of:
acquiring a sequence table and an index table,
wherein the sequence table indicates, for each of a plurality of sections into which the stream data is divided, (i) a position of a head packet, (ii) a presentation time of the head packet, (iii) a duration of time, and (iv) whether the section is an unreceivable section or a receivable section,
wherein the unreceivable section includes a section of the stream data starting from a point at which a packet missing at least a portion of data is detected when the stream data is recorded on the recording medium and ending at a point at which a packet missing no data is subsequently detected when the stream data is recorded on the recording medium, and
wherein the index table indicates, for each of a plurality of intra-pictures, a position and a presentation time of a head packet in the stream data;
receiving, from a user, an arbitrary time on a playback time axis as a seek time;
specifying a section to which the seek time belongs with reference to the sequence table;
determining the position of the head packet of an intra-picture as a decoding start position and determining the seek time as a playback start time, when the sequence table indicates that the section to which the seek time belongs is the receivable section and the index table indicates that the intra-picture having the presentation time prior to the seek time exists in the section to which the seek time belongs;
determining the position of the head packet of the section to which the seek time belongs as the decoding start position and determining the presentation time of the head packet as the playback start time, when the sequence table indicates that the section to which the seek time belongs is the receivable section and the index table indicates that the intra-picture having the presentation time prior to the seek time does not exist in the section to which the seek time belongs;
determining the position of the head packet of a section immediately after the section to which the seek time belongs as the decoding start position and determining the presentation time of the head packet of the section immediately after the section to which the seek time belongs as the playback start time, when the sequence table indicates that the section to which the seek time belongs is the unreceivable section;
reading the stream data recorded on the recording medium from a playback starting position; and
decoding the read stream data and outputting the decoded stream data to a display from a picture having a presentation time which is the same as the playback start time.

39. A stream data recording method that records stream data including a plurality of packets to a recording medium, the stream data recording method comprising the steps of:
acquiring the stream data from reception data;
recording the acquired stream data to the recording medium in units of a packet;
detecting, for each packet included in the acquired stream data, whether or not the packet is missing at least a portion of data;
generating, via a generation unit, information specifying a duration of an unreceivable section, information specifying a position of a head packet of the unreceivable section in the stream data, information specifying a duration of a receivable section, and information specifying a position of a head packet of the receivable section in the stream data,
wherein the unreceivable section includes a section of the stream data starting from a point at which a packet missing at least a portion of data is detected and ending at a point at which a packet missing no data is subsequently detected;
judging that a receivable section sandwiched between two unreceivable sections is unplayable when a duration of the sandwiched receivable section is less than or equal to threshold determined such that interruptions in audio or video are not perceived by a user;
generating, via an unplayable information generation unit, information specifying a duration of the receivable section that has been judged to be unplayable and information specifying a position in the stream data of the receivable section that has been judged to be unplayable; and recording the information generated by the generation unit and the information generated by the unplayable information generation unit on the recording medium, in correspondence with the recorded stream data.

* * * * *